US012604073B2

(12) United States Patent
Yako et al.

(10) Patent No.: US 12,604,073 B2
(45) Date of Patent: Apr. 14, 2026

(54) DEVICE AND FILTER ARRAY USED IN SYSTEM FOR GENERATING SPECTRAL IMAGES CORRESPONDING TO N WAVELENGTH BANDS WHERE N IS AN INTEGER GREATER THAN OR EQUAL TO FOUR

(71) Applicant: Panasonic Intellectual Property Management Co., Ltd., Osaka (JP)

(72) Inventors: Motoki Yako, Osaka (JP); Atsushi Ishikawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 92 days.

(21) Appl. No.: 18/675,123

(22) Filed: May 27, 2024

(65) Prior Publication Data

US 2024/0314409 A1 Sep. 19, 2024

Related U.S. Application Data

(63) Continuation of application No. PCT/JP2022/043657, filed on Nov. 28, 2022.

(30) Foreign Application Priority Data

Dec. 8, 2021 (JP) ................................. 2021-199556

(51) Int. Cl.
*H04N 23/12* (2023.01)
*G02B 5/20* (2006.01)
(52) U.S. Cl.
CPC ............. *H04N 23/12* (2023.01); *G02B 5/201* (2013.01)

(58) Field of Classification Search
CPC ........ H04N 23/12; H04N 25/10; G02B 5/201; G02B 5/20; G01J 3/2803;
(Continued)

(56) References Cited

U.S. PATENT DOCUMENTS

2007/0058921 A1* 3/2007 Lundgren ............. G01J 3/0229
385/147
2016/0138975 A1 5/2016 Ando et al.
(Continued)

FOREIGN PATENT DOCUMENTS

WO 2021/145054 7/2021

OTHER PUBLICATIONS

International Search Report of PCT application No. PCT/JP2022/043657 dated Jan. 24, 2023.
(Continued)

*Primary Examiner* — Usman A Khan
(74) *Attorney, Agent, or Firm* — Wenderoth, Lind & Ponack, L.L.P.

(57) ABSTRACT

A device used in a system for generating spectral images corresponding to four or more wavelength bands includes optical filters different in spectral transmittance and an image sensor that detects light through the optical filters, in which when the wavelength bands are given numbers in an ascending or descending order of a central wavelength, the image sensor outputs i-th mask data by detecting only light corresponding to an i-th wavelength band and outputs j-th mask data by detecting only light corresponding to a j-th wavelength band among the wavelength bands, a correlation coefficient between the i-th and j-th mask data is greater than or equal to 0.8 in a combination where |i−j| is 1, and is equal to or less than 0.8 in at least one combination where |i−j| is greater than or equal to 2 and less than or equal to N−1.

6 Claims, 18 Drawing Sheets

(58) Field of Classification Search
CPC ....... G01J 2003/2806; G01J 2003/2826; G01J 3/24; G01J 3/26; G01J 3/36
USPC ........................................................ 348/335
See application file for complete search history.

(56) References Cited

U.S. PATENT DOCUMENTS

2016/0373664 A1 * 12/2016 Wei ...................... H04N 25/131
2021/0158108 A1 * 5/2021 Ando .................. G06F 18/2411
2021/0377498 A1    12/2021 Ishikawa et al.
2024/0248241 A1 * 7/2024 Kanamori ............... G02B 5/20

OTHER PUBLICATIONS

Extended European Search Report issued Mar. 24, 2025 in corresponding European Patent Application No. 22904074.6.

* cited by examiner

A1                    A2

| | | | | | | | | | |
|---|---|---|---|---|---|---|---|---|---|
| 1 | 0.84 | 0.55 | 0.32 | 0.15 | 0 | 0.09 | 0.12 | 0.1 | 0.02 |
| 0.84 | 1 | 0.85 | 0.59 | 0.35 | 0.15 | 0 | 0.08 | 0.11 | 0.11 |
| 0.55 | 0.85 | 1 | 0.87 | 0.61 | 0.36 | 0.15 | 0.01 | 0.06 | 0.12 |
| 0.32 | 0.59 | 0.87 | 1 | 0.87 | 0.61 | 0.35 | 0.16 | 0.04 | 0.08 |
| 0.15 | 0.35 | 0.61 | 0.87 | 1 | 0.89 | 0.61 | 0.36 | 0.18 | 0 |
| 0 | 0.15 | 0.36 | 0.61 | 0.89 | 1 | 0.86 | 0.59 | 0.35 | 0.11 |
| 0.09 | 0 | 0.15 | 0.35 | 0.61 | 0.86 | 1 | 0.87 | 0.59 | 0.29 |
| 0.12 | 0.08 | 0.01 | 0.16 | 0.36 | 0.59 | 0.87 | 1 | 0.85 | 0.54 |
| 0.1 | 0.11 | 0.06 | 0.04 | 0.18 | 0.35 | 0.59 | 0.85 | 1 | 0.85 |
| 0.02 | 0.11 | 0.12 | 0.08 | 0 | 0.11 | 0.29 | 0.54 | 0.85 | 1 |

$r_{ij} = 1$
$0.8 < r_{ij} < 1$
$r_{ij} \leq 0.8$

| | | | | | | | | | |
|---|---|---|---|---|---|---|---|---|---|
| 1 | 0.65 | 0.19 | 0.06 | 0.13 | 0.09 | 0.2 | 0.22 | 0.14 | 0.04 |
| 0.65 | 1 | 0.65 | 0.17 | 0.17 | 0.18 | 0.1 | 0.29 | 0.24 | 0.05 |
| 0.19 | 0.65 | 1 | 0.61 | 0.03 | 0.3 | 0.2 | 0.16 | 0.29 | 0.16 |
| 0.06 | 0.17 | 0.61 | 1 | 0.57 | 0.05 | 0.36 | 0.26 | 0.07 | 0.22 |
| 0.13 | 0.17 | 0.03 | 0.57 | 1 | 0.51 | 0.16 | 0.43 | 0.36 | 0.05 |
| 0.09 | 0.18 | 0.3 | 0.05 | 0.51 | 1 | 0.46 | 0.19 | 0.52 | 0.49 |
| 0.2 | 0.1 | 0.2 | 0.36 | 0.16 | 0.46 | 1 | 0.5 | 0.24 | 0.63 |
| 0.22 | 0.29 | 0.16 | 0.26 | 0.43 | 0.19 | 0.5 | 1 | 0.5 | 0.22 |
| 0.14 | 0.24 | 0.29 | 0.07 | 0.36 | 0.52 | 0.24 | 0.5 | 1 | 0.58 |
| 0.04 | 0.05 | 0.16 | 0.22 | 0.05 | 0.49 | 0.63 | 0.22 | 0.58 | 1 |

$r_{ij} = 1$
$0.8 < r_{ij} < 1$
$r_{ij} \leq 0.8$

DEVICE AND FILTER ARRAY USED IN SYSTEM FOR GENERATING SPECTRAL IMAGES CORRESPONDING TO N WAVELENGTH BANDS WHERE N IS AN INTEGER GREATER THAN OR EQUAL TO FOUR

BACKGROUND

1. Technical Field

The present disclosure relates to a device and a filter array used in a system for generating a spectral image, a system for generating a spectral image, and a method for manufacturing a filter array.

2. Description of the Related Art

By using spectral information of a large number of wavelength bands, for example, several tens of bands each having a narrow bandwidth, it is possible to grasp detailed physical properties of a target, which cannot be grasped from a conventional RGB image. A camera that acquires such multi-wavelength information is called a "hyperspectral camera". The hyperspectral camera is used in various fields such as food inspection, biological tests, development of medicine, and analysis of components of minerals.

U.S. Pat. No. 9,599,511 (hereinafter referred to as Patent Literature 1) and International Publication No. 2021/145054 (hereinafter referred to as Patent Literature 2) disclose examples of a hyperspectral camera using a compressed sensing technique. In the compressed sensing technique, a compressed image in which spectral information is compressed is acquired by detecting light reflected by a target through a special filter array, and a hyperspectral image having multi-wavelength information is generated on the basis of the compressed image.

SUMMARY

One non-limiting and exemplary embodiment provides a device that can improve reconstruction accuracy of a hyperspectral image.

In one general aspect, the techniques disclosed here feature a device according to an aspect of the present disclosure used in a system for generating spectral images corresponding to N wavelength bands where N is an integer greater than or equal to 4 includes optical filters that are different from one another in spectral transmittance; and an image sensor that detects light that has passed through the optical filters, in which the image sensor outputs i-th mask data corresponding to a pixel value distribution corresponding to an i-th wavelength band among the N wavelength bands by detecting only light corresponding to the i-th wavelength band where i is an integer greater than or equal to 1 and less than or equal to N and outputs j-th mask data corresponding to a pixel value distribution corresponding to a j-th wavelength band among the N wavelength bands by detecting only light corresponding to the j-th wavelength band where j is an integer greater than or equal to 1 and less than or equal to N, a correlation coefficient $r_{ij}$ between the i-th mask data and the j-th mask data is expressed as follows:

$$r_{ij} = \left| \frac{\sum_m \sum_n (i_{mn} - i_0)(j_{mn} - j_0)}{\sqrt{\left(\sum_m \sum_n (i_{mn} - i_0)^2\right)\left(\sum_m \sum_n (j_{mn} - j_0)^2\right)}} \right|$$

where $i_{mn}$ and $j_{mn}$ are a pixel value of a pixel at an m-th row and an n-th column of the i-th mask data and a pixel value of a pixel at an m-th row and an n-th column of the j-th mask data, respectively, $i_0$ and $j_0$ are an average of pixel values of the i-th mask data and an average of pixel values of the j-th mask data, respectively, and the N wavelength bands are given numbers in an ascending or descending order of a central wavelength, the correlation coefficient $r_{ij}$ satisfies $r_{ij} \geq 0.8$ in a combination of the i-th mask data and the j-th mask data in which |i−j| is 1, and the correlation coefficient $r_{ij}$ satisfies $r_{ij} \leq 0.8$ in at least one combination of the i-th mask data and the j-th mask data in which |i−j| is greater than or equal to 2 and less than or equal to N−1.

According to the aspect of the present disclosure, it is possible to provide a device that can improve reconstruction accuracy of a hyperspectral image.

It should be noted that general or specific embodiments may be implemented as a device, a system, a method, an integrated circuit, a computer program, a computer-readable storage medium, or any selective combination thereof. Examples of the computer-readable storage medium include non-volatile recording media such as a compact disc-read only memory (CD-ROM).

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTIONS

Figures 1A, 1B:
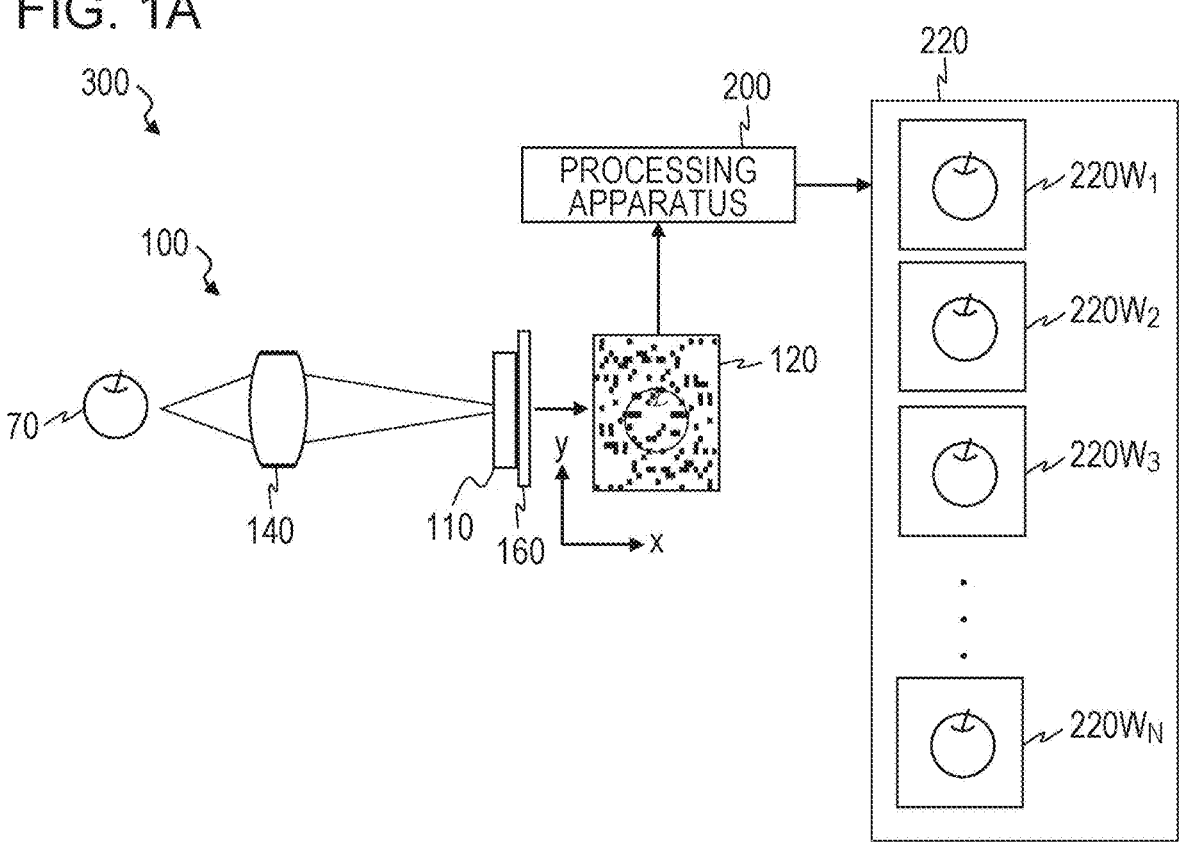
FIG. 1A schematically illustrates a configuration of an imaging system according to an exemplary embodiment of the present disclosure.
FIG. 1B schematically illustrates another configuration of the imaging system according to the exemplary embodiment of the present disclosure.

The embodiment described below illustrates a general or specific example. Numerical values, shapes, materials, constituent elements, positions of the constituent elements, the way in which the constituent elements are connected, steps, and the order of steps in the embodiment below are examples and do not limit the technique of the present disclosure. Among constituent elements in the embodiment below, constituent elements that are not described in independent claims indicating highest concepts are described as optional constituent elements. Each drawing is a schematic view and is not necessarily strict illustration. In each drawing, substantially identical or similar constituent elements are given identical reference signs. Repeated description is sometimes omitted or simplified.

In the present disclosure, all or a part of any of circuit, unit, device, part or portion, or any of functional blocks in the block diagrams may be implemented as one or more of electronic circuits including a semiconductor device, a semiconductor integrated circuit (IC), or a large scale integration (LSI). The LSI or IC can be integrated into one chip, or also can be a combination of chips. For example, functional blocks other than a memory may be integrated into one chip. The name used here is LSI or IC, but it may also be called system LSI, very large scale integration (VLSI), or ultra large scale integration (ULSI) depending on the degree of integration. A Field Programmable Gate Array (FPGA) that can be programmed after manufacturing an LSI or a reconfigurable logic device that allows reconfiguration of the connection or setup of circuit cells inside the LSI can be used for the same purpose.

Further, it is also possible that all or a part of the functions or operations of the circuit, unit, device, part or portion are implemented by executing software. In such a case, the software is recorded on one or more non-transitory recording media such as a ROM, an optical disk or a hard disk drive, and when the software is executed by a processor, the software causes the processor together with peripheral devices to execute the functions specified in the software. A system or apparatus may include such one or more non-transitory recording media on which the software is recorded and a processor together with necessary hardware devices such as an interface.

Explanation of Terms in Present Specification

Before describing the embodiment of the present disclosure, terms used in the present specification are described. An imaging device according to the present embodiment acquires a compressed image in which spectral information is compressed by imaging light reflected by a target through a filter array including optical filters arranged within a two-dimensional plane. The imaging device according to the present embodiment further generates a spectral image concerning each of N wavelength bands (N is an integer greater than or equal to 4) within a target wavelength range from the compressed image by computation based on mask data of the filter array. As a result, a hyperspectral image of the target can be generated. By properly designing the mask data of the filter array, reconstruction accuracy of the hyperspectral image of the target can be improved.

Target Wavelength Range

The target wavelength range is a wavelength range determined on the basis of an upper limit and a lower limit of a wavelength of light incident on an image sensor used for imaging. The target wavelength range can be, for example, any range within a range from an upper limit to a lower limit of a wavelength where the image sensor has sensitivity, that is, a sensitivity wavelength range. In a case where a target that absorbs and/or reflects light in the sensitivity wavelength range is disposed on an optical axis of the image sensor, the target wavelength range may be a part of the sensitivity wavelength range of the image sensor. The target wavelength range may correspond to a wavelength range of data output from the image sensor, that is, an output wavelength range.

Wavelength Resolution

A wavelength resolution is a width of a wavelength band for each of which a spectral image is generated by reconstruction. For example, in a case where a spectral image corresponding to a wavelength range having a width of 5 nm is generated, the wavelength resolution is 5 nm. Similarly, in a case where a spectral image corresponding to a wavelength range having a width of 20 nm is generated, the wavelength resolution is 20 nm.

Mask Data

Mask data is data indicating arrangement based on a spatial distribution of transmittance of the filter array. Data indicating a spatial distribution of transmittance of the filter array itself may be used as the mask data or data obtained by performing reversible calculation on the transmittance of the filter array may be used as the mask data. The reversible calculation is, for example, addition, subtraction, multiplication and division of a certain value, exponentiation, index calculation, logarithm calculation, and gamma correction. The reversible calculation may be uniformly performed within the target wavelength range or may be performed for each wavelength band, which will be described later.

In a case where data indicating a spatial distribution of transmittance of the filter array itself is used as the mask data, an intensity of light that passes the filter array in a wavelength range having a finite width within the target wavelength range is observed as a matrix in which data is arranged two-dimensionally. The target wavelength range can be, for example, greater than or equal to 400 nm and less than or equal to 700 nm, and the wavelength range having a finite width can be, for example, greater than or equal to 400 nm and less than or equal to 450 nm. By performing the observation so that the entire target wavelength range is covered, matrices are generated. Each of the matrices is data arranged two-dimensionally in a space direction. The data arranged two-dimensionally in a space direction acquired in wavelength ranges is collectively referred to as mask data.

The wavelength range greater than or equal to 400 nm and less than or equal to 450 nm is the "wavelength range having a finite width" in the above example, and wavelengths are not distinguished within this wavelength range in calculation. That is, only intensity information is recorded and used for calculation, and therefore only an intensity is recorded and no wavelength information is stored both in a case where light of 420 nm is incident and a case where light of 430 nm is incident. Accordingly, all wavelengths within this wavelength range are handled as an identical wavelength in calculation.

A spatial distribution of transmittance of the filter array can be, for example, observed by using a light source that outputs only a specific wavelength and an integrating sphere. In the above example, only light of a wavelength greater than or equal to 400 nm and less than or equal to 450 nm is output from a light source, and the output light is detected through the filter array after being diffused uniformly by the integrating sphere. As a result, an image in which, for example, sensitivity of the image sensor and/or aberration of a lens is superimposed on a spatial distribution of transmittance of the filter array in the wavelength range greater than or equal to 400 nm and less than or equal to 450 nm is obtained. The obtained image can be handled as a matrix. In a case where the sensitivity of the image sensor and/or the aberration of the lens are known, the spatial distribution of the transmittance of the filter array can be obtained by correcting the obtained image. It can be interpreted that the obtained image is an image obtained by performing reversible calculation such as the sensitivity of the image sensor and/or the aberration of the lens on the spatial distribution of the transmittance of the filter array. Therefore, the obtained image need not necessarily be corrected.

Actually, transmittance cannot be non-continuously changed before and after a certain wavelength and fluctuates with a finite rising angle or falling angle. Therefore, an upper limit and a lower limit of a wavelength range can be defined by a wavelength at which transmittance has attenuated from a peak intensity by a certain percentage. The certain percentage can be, for example, 90%, 50%, or 10% of the peak intensity.

In a case where mask data is, for example, stored in a memory, the mask data can be compressed in a reversible format such as Portable Network Graphics (PNG) or Graphics Interchange Format (GIF).

Wavelength Band

The wavelength band is a wavelength range within the target wavelength range and is a range of wavelengths handled as an identical wavelength in mask data. The wavelength band can be a wavelength range having a certain width as is indicated by "band". The wavelength band can be, for example, a wavelength range having a width of 50 nm that is greater than or equal to 500 nm and less than or equal to 550 nm. In the present specification, a group of wavelength ranges having a certain width is also referred to as a "wavelength band". The wavelength band can be a wavelength range having a width of 100 nm obtained by summing up a wavelength range having a width 50 nm that is greater than or equal to 500 nm and less than or equal to 550 nm and a wavelength range having a width 50 nm that is greater than or equal to 600 nm and less than or equal to 650 nm. Since a wavelength band may be handled as an identical wavelength in mask data, whether wavelength ranges are continuous need not be considered.

Spectral Image

The spectral image is a two-dimensional image output for each wavelength band as a result of reconstruction computation. Since the spectral image is generated for each wavelength band, one spectral image is decided corresponding to a certain wavelength band. The spectral image may be output as a monochromatic image. Spectral images corresponding to wavelength bands may be output as data three-dimensionally arranged in a space direction and a wavelength direction. Alternatively, the spectral images may be output as data in which pixel values are arranged one-dimensionally. Each of the pixel values corresponds to a combination of a wavelength band and a pixel. Alternatively, spectral images given header information including meta-information such as space resolution and the number of wavelength bands may be output. In the present specification, the spectral image is also referred to as a reconstructed image.

Reconstruction Accuracy

Reconstruction accuracy is a degree of deviation between a generated spectral image and a correct image. The reconstruction accuracy can be expressed by using various indices such as a Mean Squared Error (MSE) and a Peak Signal-to-Noise Ratio (PSNR). Actually, it is often not easy to define the correct image. In this case, the correct image may be defined and actual reconstruction accuracy may be estimated or defined by the following method. The method is, for example, to examine wavelength dependency of the correct image by using a band-pass filter that allows only light having a specific wavelength to pass, a target whose transmission and/or reflection spectra are known, and a laser whose light emission wavelength is known.

Underlying Knowledge Forming Basis of the Present Disclosure

Next, before description of the embodiment of the present disclosure, image reconstruction processing based on sparsity and a method for evaluating randomness of mask data are described in relation to the problem to be solved by the present disclosure.

Sparsity is such a property that an element that characterizes a target is present sparsely in a certain direction such as a space direction or a wavelength direction. Sparsity is widely observed in nature. By utilizing sparsity, necessary information can be efficiently acquired. A sensing technique utilizing sparsity is called a compressed sensing technique. It has been revealed that the compressed sensing technique makes it possible to efficiently construct a device or a system. As disclosed in Patent Literature 1, application of the compressed sensing technique to a hyperspectral camera allows improvement in wavelength resolution, high-resolution, multiple-wavelength, and imaging of a multiple-wavelength moving image.

An example of application of the compressed sensing technique to a hyperspectral camera is as follows. A filter array through which light reflected by a target passes and an image sensor that detects light that passes through the filter array are disposed on an optical path of the reflected light. The filter array has random transmission characteristics in a space direction and/or a wavelength direction. The light reflected by the target passes through the filter array, and as a result, the target can be imaged in such a manner that information on the target is coded. By generating a spectral image from the compressed image thus taken on the basis of mask data of the filter array, hyperspectral image reconstruction processing can be performed. The reconstruction processing is performed by estimation computation assuming sparsity of a target, that is, sparse reconstruction. Computation performed in sparse reconstruction can be, for example, computation of estimating a spectral image by minimization of an evaluation function including a regularization term, as disclosed in Patent Literature 1. The regularization term can be, for example, discrete cosine transform (DCT), wavelet transform, Fourier transform, or total variation (TV).

In reconstruction processing of a hyperspectral image based on sparse reconstruction, it is assumed that information on a target is randomly sampled. Randomness of transmittance of a filter array in a space direction and a wavelength direction influences reconstruction accuracy of a hyperspectral image. In a case where a filter that is not random in the space direction is used, a spatial information amount is insufficient, and a hyperspectral image in which space information is missing is generated. In a case where a filter that is not random in the wavelength direction is used, wavelength information is insufficient, and wavelength resolution decreases in reconstruction of a hyperspectral image. As for randomness in a space direction, an evaluation method based on a standard deviation of an average $\mu1$ of transmittances corresponding to filters included in a filter array concerning light of a first wavelength band to an average $\mu N$ of transmittances corresponding to the filters included in the filter array concerning light of an N-th wavelength band is disclosed (Patent Literature 2). As for randomness in a wavelength direction, an evaluation method based on a correlation coefficient concerning two wavelength bands is disclosed (Japanese Patent No. 6478579).

The inventors of the present invention focused on sparsity of a substance existing in nature in a wavelength direction and found that reconstruction accuracy of a hyperspectral image is improved in a case where randomness in the wavelength direction is lessened from complete randomness to a certain extent.

A device according to an embodiment of the present disclosure includes optical filters that are different from one another in spectral transmittance and an image sensor that detects light that has passed through the optical filters. Randomness of transmittances of the optical filters in a wavelength direction is lessened from complete randomness to a certain extent. As a result, it is possible to improve reconstruction accuracy of a hyperspectral image. A device and a filter array used in a system for generating a spectral image, a system for generating a spectral image, and a method for manufacturing a filter array according to the embodiment of the present disclosure are described below.

A device according to a first item is a device used in a system for generating spectral images corresponding to N wavelength bands where N is an integer greater than or equal to 4. The device includes optical filters that are different from one another in spectral transmittance and an image sensor that detects light that has passed through the optical filters. The image sensor outputs i-th mask data corresponding to a pixel value distribution corresponding to an i-th wavelength band among the N wavelength bands by detecting only light corresponding to the i-th wavelength band where i is an integer greater than or equal to 1 and less than or equal to N and outputs j-th mask data corresponding to a pixel value distribution corresponding to a j-th wavelength band among the N wavelength bands by detecting only light corresponding to the j-th wavelength band where j is an integer greater than or equal to 1 and less than or equal to N. A correlation coefficient $r_{ij}$ between the i-th mask data and the j-th mask data is expressed as follows:

$$r_{ij} = \left| \frac{\sum_m \sum_n (i_{mn} - i_0)(j_{mn} - j_0)}{\sqrt{\left(\sum_m \sum_n (i_{mn} - i_0)^2\right)\left(\sum_m \sum_n (j_{mn} - j_0)^2\right)}} \right|$$

where $i_{mn}$ and $j_{mn}$ are a pixel value of a pixel at an m-th row and an n-th column of the i-th mask data and a pixel value of a pixel at an m-th row and an n-th column of the j-th mask data, respectively, $i_0$ and $j_0$ are an average of pixel values of the i-th mask data and an average of pixel values of the j-th mask data, respectively. In a case where the N wavelength bands are given numbers in an ascending or descending order of a central wavelength, the correlation coefficient $r_{ij}$ satisfies $r_{ij} \geq 0.8$ in a combination of the i-th mask data and the j-th mask data in which |i−j| is 1, and the correlation coefficient $r_{ij}$ satisfies $r_{ij} \leq 0.8$ in at least one combination of the i-th mask data and the j-th mask data in which |i−j| is greater than or equal to 2 and less than or equal to N−1.

According to this device, it is possible to improve reconstruction accuracy of a hyperspectral image.

In the device according to the first item, a device according to a second item is configured such that the correlation coefficient $r_{ij}$ satisfies $r_{ij} \geq 0.8$ in a combination of the i-th mask data and the j-th mask data in which |i−j| is greater than or equal to 1 and less than or equal to k, and the correlation coefficient $r_{ij}$ satisfies $r_{ij} \leq 0.8$ in a combination of the i-th mask data and the j-th mask data in which |i−j| is greater than or equal to k+1 where k is an integer that satisfies $1 \leq k \leq N-2$.

According to this device, it is possible to improve reconstruction accuracy of a hyperspectral image in an example in which mask data concerning wavelength bands that are close to a certain degree are similar to each other and mask data concerning other wavelength bands are not similar to each other.

In the device according to the second item, a device according to a third item is configured such that k=1.

According to this device, it is possible to improve reconstruction accuracy of a hyperspectral image in an example in which sparsity in a wavelength direction which many targets have is universally reflected.

A filter array according to a fourth item is a filter array used in a system for generating spectral images corresponding to N wavelength bands where N is an integer greater than or equal to 4. The filter array includes optical filters that are different from one another in spectral transmittance. A correlation coefficient $r_{ij}$ between an i-th transmittance distribution of the optical filters concerning light of an i-th wavelength band among the N wavelength bands where i is an integer greater than or equal to 1 and less than or equal to N and a j-th transmittance distribution of the optical filters concerning light of a j-th wavelength band among the N wavelength bands where j is an integer greater than or equal to 1 and less than or equal to N is expressed as follows:

$$r_{ij} = \left| \frac{\sum_m \sum_n (i_{mn} - i_0)(j_{mn} - j_0)}{\sqrt{\left(\sum_m \sum_n (i_{mn} - i_0)^2\right)\left(\sum_m \sum_n (j_{mn} - j_0)^2\right)}} \right|$$

where $i_{mn}$ and $j_{mn}$ are transmittance of an optical filter at an m-th row and an n-th column in the transmittance distribution of the optical filters concerning the light of the i-th wavelength band and transmittance of an optical filter at an m-th row and an n-th column in the transmittance distribution of the optical filters concerning the light of the j-th wavelength band, respectively, and $i_0$ and $j_0$ are an average of transmittances of the i-th transmittance distribution and an average of transmittances of the j-th transmittance distribution, respectively. In a case where the N wavelength bands are given numbers in an ascending or descending order of a central wavelength, the correlation coefficient $r_{ij}$ satisfies $r_{ij} \geq 0.8$ in a combination of the i-th transmittance distribution and the j-th transmittance distribution in which $|i-j|$ is 1, and the correlation coefficient $r_{ij}$ satisfies $r_{ij} \leq 0.8$ in at least one combination of the i-th transmittance distribution and the j-th transmittance distribution in which $|i-j|$ is greater than or equal to 2 and less than or equal to N−1.

According to this filter array, it is possible to improve reconstruction accuracy of a hyperspectral image.

A system according to a fifth item is a system for generating spectral images corresponding to N wavelength bands where N is an integer greater than or equal to 4. The system includes the device according to any one of the first to third items and a processing circuit. The processing circuit causes the image sensor included in the device to detect light through the optical filters and thereby generate and output an image signal, and generates and outputs the spectral images on the basis of the image signal and N pieces of mask data corresponding to the N wavelength bands.

According to this system, it is possible to improve reconstruction accuracy of a hyperspectral image.

A method for manufacturing a filter array according to a sixth item is a method for manufacturing a filter array used in a system for generating spectral images corresponding to N wavelength bands where N is an integer greater than or equal to 4. The filter array includes optical filters that are different from one another in spectral transmittance. The method for manufacturing the filter array includes calculating a correlation coefficient between the spectral images of a target concerning all combinations of two different wavelength bands among the N wavelength bands; and designing a transmittance distribution of the optical filters for each of the N wavelength bands on the basis of the correlation coefficient.

According to this method for manufacturing a filter array, it is possible to manufacture a filter array that can improve reconstruction accuracy of a hyperspectral image.

A more specific embodiment of the present disclosure is described below with reference to the drawings.

Embodiment

Imaging System

First, an example of a configuration of an imaging system used in the embodiment of the present disclosure is described with reference to FIGS. 1A to 1D.

FIG. 1A schematically illustrates a configuration of an imaging system according to an exemplary embodiment of the present disclosure. The imaging system 300 illustrated in FIG. 1A includes an imaging device 100 and a processing apparatus 200. The imaging device 100 includes a similar configuration to the imaging device disclosed in Patent Literature 1. The imaging device 100 includes an optical system 140, a filter array 110, and an image sensor 160. The optical system 140 and the filter array 110 are disposed on an optical path of light reflected by a target 70, which is a subject. The filter array 110 is disposed between the optical system 140 and the image sensor 160.

In FIG. 1A, an apple is illustrated as an example of the target 70. The target 70 is not limited to an apple and can be any object that can be an inspection target. The image sensor 160 generates data of a compressed image 120 that is information on wavelength bands compressed as a two-dimensional monochromatic image. The processing apparatus 200 can generate image data for each of wavelength bands included in a target wavelength range on the basis of the data of the compressed image 120 generated by the image sensor 160. The generated pieces of image data that correspond to the wavelength bands on a one-to-one basis are hereinafter referred to as "hyperspectral image data". It is assumed here that the number of wavelength bands included in the target wavelength range is N (N is an integer greater than or equal to 4). In the following description, the generated pieces of image data that correspond to the wavelength bands on a one-to-one basis are referred to as a spectral image $220W_1$, a spectral image $220W_2$, . . . , and a spectral image $220W_N$, which are collectively referred to as a "hyperspectral image 220". Hereinafter, signals indicative of an image, that is, a collection of signals indicative of pixel values of pixels is sometimes referred to simply as an "image".

The filter array 110 includes light-transmitting optical filters that are arranged in rows and columns. The optical filters include kinds of optical filters that are different from each other in spectral transmittance, that is, wavelength dependence of transmittance. The filter array 110 outputs incident light after modulating an intensity of the incident light for each wavelength. This process performed by the filter array 110 is hereinafter referred to as "coding".

In the example illustrated in FIG. 1A, the filter array 110 is disposed in the vicinity of or directly above the image sensor 160. The "vicinity" as used herein means being close to such a degree that an image of light from the optical system 140 is formed on a surface of the filter array 110 in a certain level of clarity. The "directly above" means that the filter array 110 and the image sensor 160 are disposed close to such a degree that almost no gap is formed therebetween. The filter array 110 and the image sensor 160 may be integral with each other.

The optical system 140 includes at least one lens. Although the optical system 140 is illustrated as a single lens in FIG. 1A, the optical system 140 may be a combination of lenses. The optical system 140 forms an image on an imaging surface of the image sensor 160 through the filter array 110.

The image sensor 160 is a monochromatic photodetector that has photodetection elements (hereinafter also referred to as "pixels") that are arranged two-dimensionally. The image sensor 160 can be, for example, a charge-coupled device (CCD), a complementary metal oxide semiconductor (CMOS) sensor, or an infrared array sensor. Each of the photodetection elements includes, for example, a photodiode. The image sensor 160 need not necessarily be a monochromatic sensor. For example, it is also possible to use a color-type sensor including R/G/B optical filters (an optical filter that allows red light to pass therethrough, an optical filter that allows green light to pass therethrough, and an optical filter that allows blue light to pass therethrough), R/G/B/IR optical filters (an optical filter that allows red light to pass therethrough, an optical filter that allows green light to pass therethrough, an optical filter that allows blue light to pass therethrough, and an optical filter that allows an infrared ray to pass therethrough), or R/G/B/W optical filters (an optical filter that allows red light to pass therethrough, an optical filter that allows green light to pass therethrough, an optical filter that allows blue light to pass therethrough, and an optical filter that allows white light to pass therethrough). Use of a color-type sensor can increase an amount of information concerning a wavelength and can improve accuracy of reconstruction of the hyperspectral image 220. The target wavelength range may be any wavelength range, and is not limited to a visible wavelength range and may be a wavelength range such as an ultraviolet wavelength range, a near-infrared wavelength range, a mid-infrared wavelength range, or a far-infrared wavelength range.

The processing apparatus 200 is a computer including a processor and a storage medium such as a memory. The processing apparatus 200 generates data of the spectral image $220W_1$ corresponding to the wavelength band $W_1$, the spectral image 220 $W_2$ corresponding to the wavelength band $W_2$, . . . , and the spectral image $220W_N$ corresponding to the wavelength band $W_N$ on the basis of the compressed image 120 acquired by the image sensor 160.

Figures 1C, 1D:
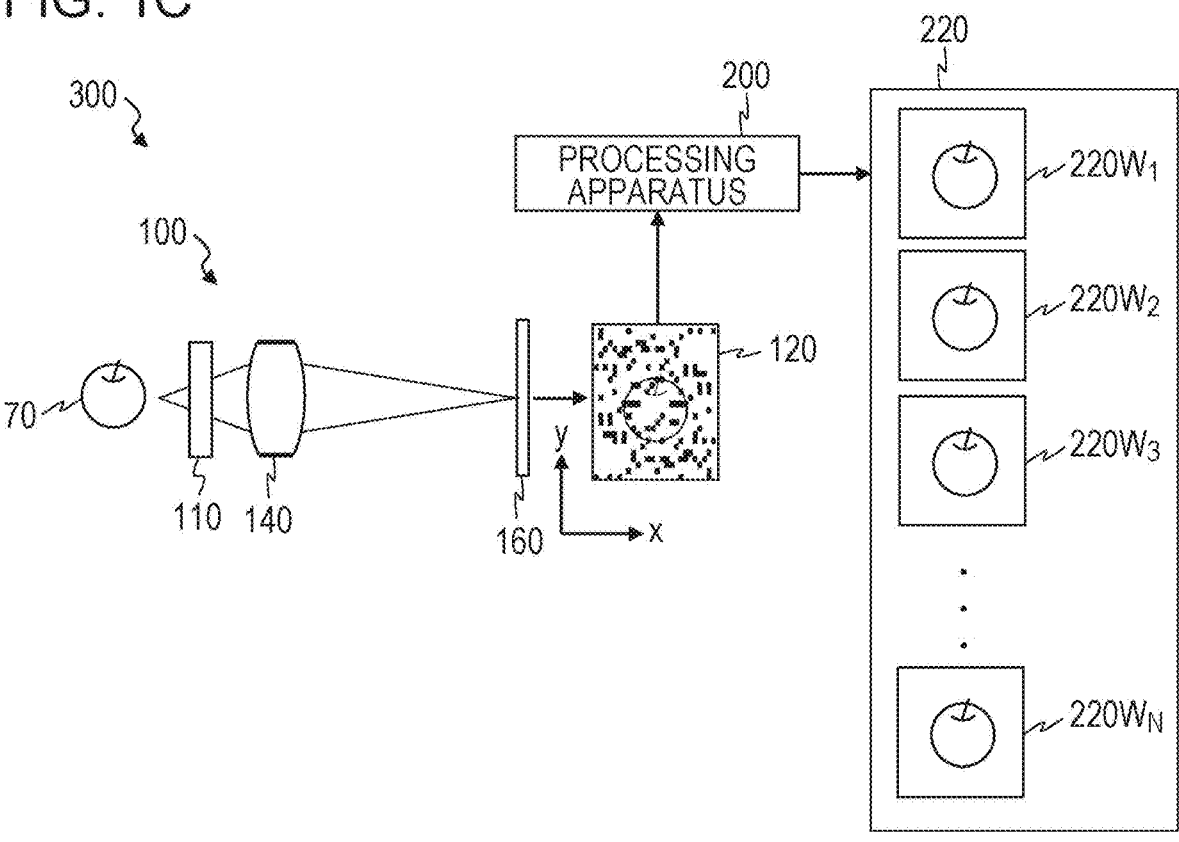
FIG. 1C schematically illustrates still another configuration of the imaging system according to the exemplary embodiment of the present disclosure.
FIG. 1D schematically illustrates still another configuration of the imaging system according to the exemplary embodiment of the present disclosure.

FIGS. 1B to 1D schematically illustrate another configuration of the imaging system according to the exemplary embodiment of the present disclosure. In the imaging system 300 illustrated in FIGS. 1B to 1D, the filter array 110 is disposed away from the image sensor 160 in the imaging device 100. In the example illustrated in FIG. 1B, the filter array 110 is disposed away from the image sensor 160 between the optical system 140 and the image sensor 160. In the example illustrated in FIG. 1C, the filter array 110 is disposed between the target 70 and the optical system 140. In the example illustrated in FIG. 1D, the imaging device 100 includes optical systems 140A and 140B, and the filter array 110 is disposed between the optical systems 140A and 140B. As in these examples, an optical system including one or more lenses may be disposed between the filter array 110 and the image sensor 160.

Characteristics of Filter Array

Figure 2A:
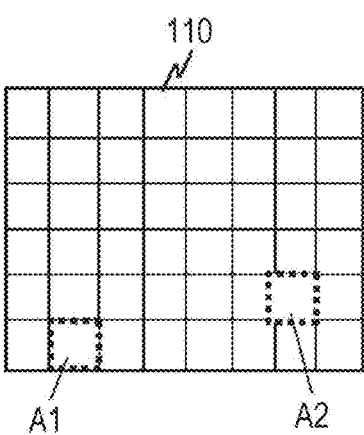
FIG. 2A schematically illustrates an example of a filter array.

Next, characteristics of the filter array 110 are described with reference to FIGS. 2A to 4B. FIG. 2A schematically illustrates an example of the filter array 110. The filter array 110 includes regions arranged within a two-dimensional plane. Hereinafter, each of the regions is sometimes referred to as a "cell". In each of the regions, an optical filter having individually set spectral transmittance is disposed. The spectral transmittance is expressed as a function T (λ) where λ is a wavelength of incident light. The spectral transmittance T (λ) can take a value greater than or equal to 0 and less than or equal to 1.

In the example illustrated in FIG. 2A, the filter array 110 has 48 rectangular regions arranged in 6 rows and 8 columns. This is merely an example, and a larger number of regions can be provided in actual use. For example, the number of regions may be similar to the number of pixels of the image sensor 160. The number of optical filters included in the filter array 110 is, for example, decided within a range from tens of optical filters to tens of millions of optical filters.

Figure 2B:
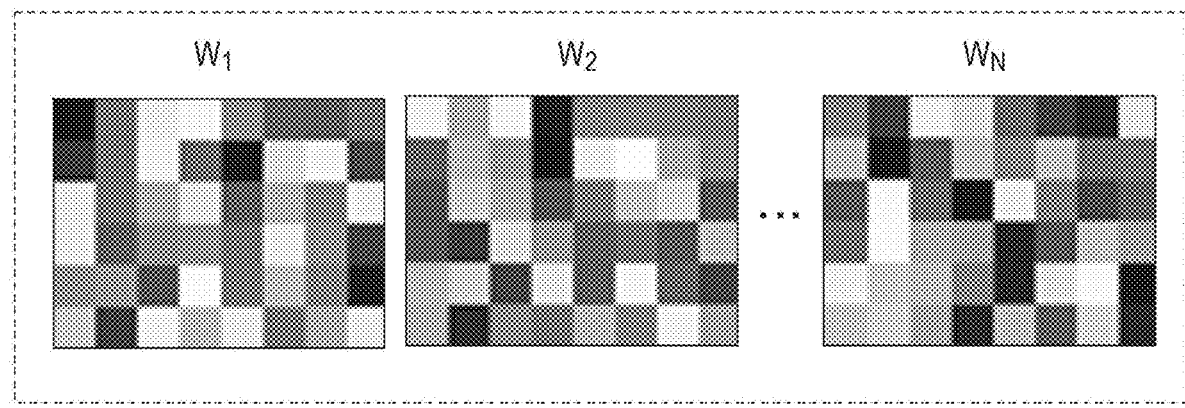
FIG. 2B illustrates an example of a spatial distribution of transmittance of light of each of wavelength bands included in a target wavelength range.
Figures 2C, 2D:
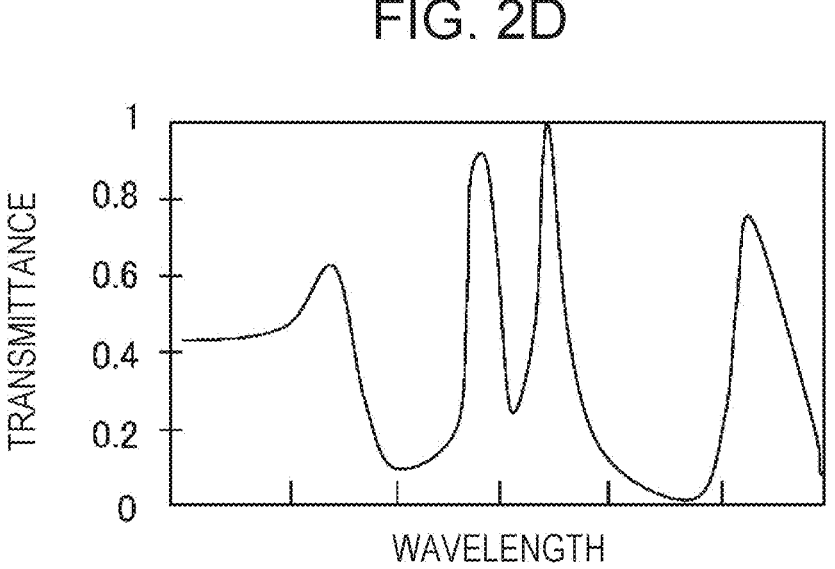
FIG. 2C illustrates an example of spectral transmittance of a region included in the filter array illustrated in FIG. 2A.
FIG. 2D illustrates an example of spectral transmittance of a region included in the filter array illustrated in FIG. 2A.

FIG. 2B illustrates an example of a spatial distribution of transmittance of light of each of the wavelength bands $W_1$, $W_2$, . . . , and $W_N$ included in the target wavelength range. In the example illustrated in FIG. 2B, differences in density among regions represent differences in transmittance. A paler region has higher transmittance, and a deeper region has lower transmittance. As illustrated in FIG. 2B, a spatial distribution of light transmittance varies depending on a wavelength band. Data indicative of a spatial distribution of transmittance of the filter array 110 for each of the wavelength bands included in the target wavelength range is mask data of the filter array 110. FIGS. 2C and 2D illustrate an example of spectral transmittance of a region A1 and an example of spectral transmittance of a region A2 included in the filter array 110 illustrated in FIG. 2A, respectively. The spectral transmittance of the region A1 and the spectral transmittance of the region A2 are different from each other. That is, the spectral transmittance of one region included in the filter array 110 varies from another region included in the filter array 110. However, not all regions need to be different in spectral transmittance. In the filter array 110, at least some of the regions are different from each other in spectral transmittance. The filter array 110 includes two or more filters that are different from each other in spectral transmittance. That is, the filter array 110 includes kinds of optical filters that are different in transmission spectrum. In one example, the number of patterns of spectral transmittance of the regions included in the filter array 110 can be identical to or larger than the number N of wavelength bands included in the target wavelength range. The filter array 110 may be designed so that half or more of the regions is different in spectral transmittance. In another example, the filter array 110 includes $10^6$ to $10^7$ optical filters, and the optical filters can include four or more kinds of optical filters that are arranged irregularly.

Figure 3A:
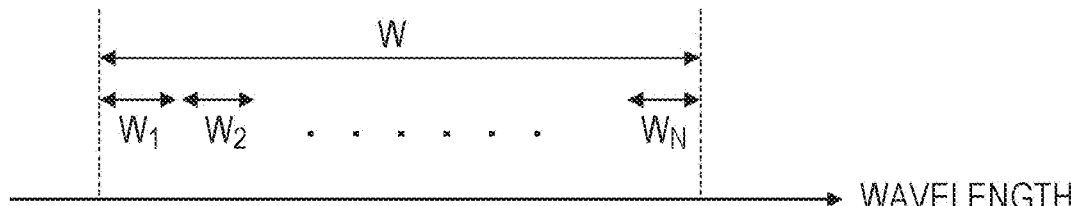
FIG. 3A is a diagram for explaining a relationship between a target wavelength range and wavelength bands included in the target wavelength range.
Figure 3B:
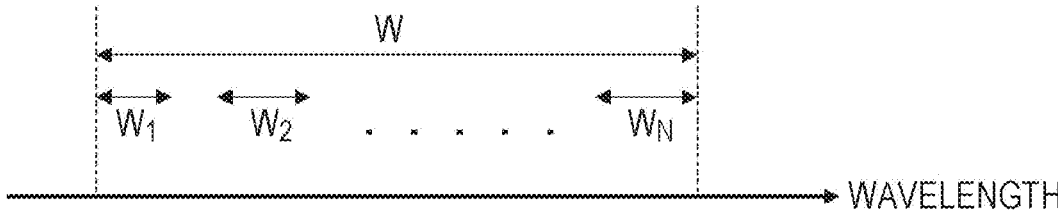
FIG. 3B is a diagram for explaining a relationship between the target wavelength range and the wavelength bands included in the target wavelength range.

FIGS. 3A and 3B are diagrams for explaining a relationship between the target wavelength range W and the wavelength bands $W_1$, $W_2$, . . . , and $W_N$ included in the target wavelength range W. The target wavelength range W can be set to various ranges depending on use. The target wavelength range W can be, for example, a wavelength range of visible light greater than or equal to approximately 400 nm and less than or equal to approximately 700 nm, a wavelength range of a near-infrared ray greater than or equal to approximately 700 nm and less than or equal to approximately 2500 nm, or a wavelength range of a near-ultraviolet ray greater than or equal to approximately 10 nm and less than or equal to approximately 400 nm. Alternatively, the target wavelength range W may be a wavelength range such as a mid-infrared wavelength range or a far-infrared wavelength range. That is, a wavelength range used is not limited to a visible light region.

Hereinafter, "light" means electromagnetic waves including not only visible light (having a wavelength greater than or equal to approximately 400 nm and less than or equal to approximately 700 nm), but also an ultraviolet ray (having a wavelength greater than or equal to approximately 10 nm and less than or equal to approximately 400 nm) and an infrared ray (having a wavelength greater than or equal to approximately 700 nm and less than or equal to approximately 1 mm).

In the example illustrated in FIG. 3A, N wavelength ranges obtained by equally dividing the target wavelength range W are the wavelength band $W_1$, the wavelength band $W_2, \ldots$, and the wavelength band $W_N$ where N is an integer greater than or equal to 4. However, such an example is not restrictive. The wavelength bands included in the target wavelength range W may be set in any ways. For example, the wavelength bands may have non-uniform bandwidths. A gap may be present between adjacent wavelength bands or adjacent wavelength bands may overlap each other. In the example illustrated in FIG. 3B, a bandwidth varies from one wavelength band to another and a gap is present between adjacent two wavelength bands. In this way, the wavelength bands can be decided in any way as long as the wavelength bands are different from one another.

Figure 4A:
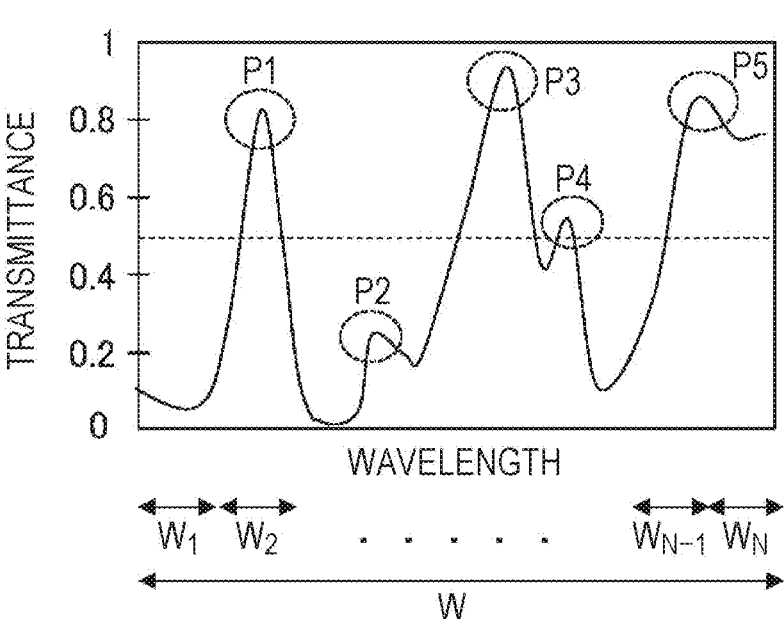
FIG. 4A is a graph for explaining characteristics of spectral transmittance in a certain region of the filter array.

FIG. 4A is a graph for explaining characteristics of spectral transmittance in a region of the filter array 110. In the example illustrated in FIG. 4A, the spectral transmittance has local maximum values (i.e., local maximum values P1 to P5) and minimum values concerning wavelengths within the target wavelength range W. In the example illustrated in FIG. 4A, normalization is performed so that a maximum value of light transmittance within the target wavelength range W is 1 and a minimum value of light transmittance within the target wavelength range W is 0. In the example illustrated in FIG. 4A, the spectral transmittance has a local maximum value in each of the wavelength ranges such as the wavelength band $W_2$ and a wavelength band $W_{N-1}$. In this way, spectral transmittance of each region can be designed in such a manner that at least two wavelength ranges among the wavelength bands $W_1$ to $W_N$ each have a local maximum value. In the example of FIG. 4A, the local maximum value P1, the local maximum value P3, the local maximum value P4, and the maximum value P5 are 0.5 or more.

As described above, light transmittance of each region varies depending on a wavelength. Therefore, the filter array 110 allows a component of a certain wavelength range of incident light to pass therethrough much and hardly allows a component of another wavelength range to pass therethrough. For example, transmittance of light of k wavelength bands among the N wavelength bands can be larger than 0.5, and transmittance of light of remaining N–k wavelength ranges can be less than 0.5. k is an integer that satisfies $2 \leq k < N$. If incident light is white light equally including all visible light wavelength components, the filter array 110 modulates, for each region, the incident light into light having discrete intensity peaks concerning wavelengths and superimposes and outputs the light of multiple wavelengths.

Figure 4B:
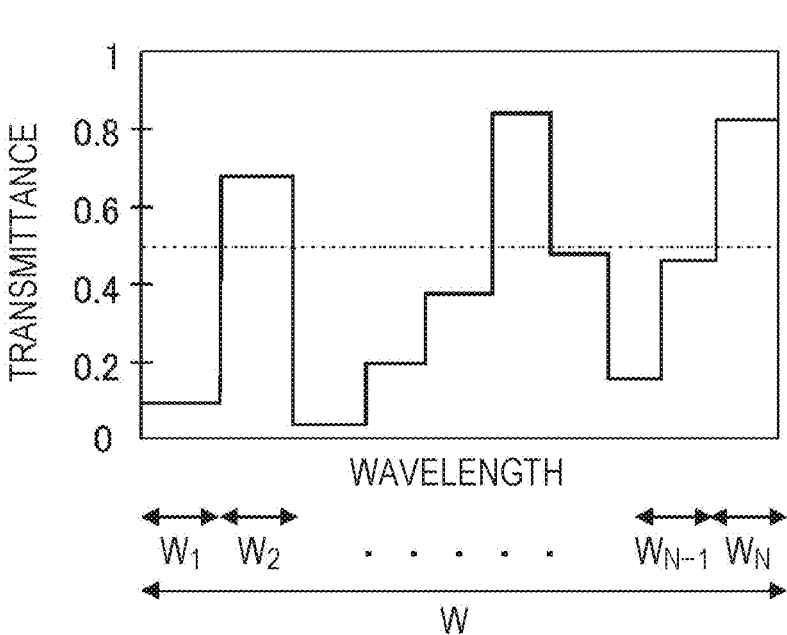
FIG. 4B illustrates a result of averaging the spectral transmittance illustrated in FIG. 4A for each wavelength band.

FIG. 4B illustrates, for example, a result of averaging the spectral transmittance illustrated in FIG. 4A for each of the wavelength band $W_1$, the wavelength band $W_2, \ldots$, and the wavelength band $W_N$. The averaged transmittance is obtained by integrating the spectral transmittance T ($\lambda$) for each wavelength band and dividing the integrated spectral transmittance T ($\lambda$) by a bandwidth of the wavelength band. Hereinafter, a value of the averaged transmittance for each wavelength band is used as transmittance in the wavelength band. In this example, transmittance is markedly high in a wavelength range that takes the local maximum value P1, a wavelength range that takes the local maximum value P3, and a wavelength range that takes the local maximum value P5. In particular, transmittance is higher than 0.8 in the wavelength range that takes the local maximum value P3 and the wavelength range that takes the local maximum value P5.

In the example illustrated in FIGS. 2A to 2D, a gray-scale transmittance distribution in which transmittance of each region can take any value greater than or equal to 0 and less than or equal to 1 is assumed. However, the transmittance distribution need not necessarily be a gray-scale transmittance distribution. For example, a binary-scale transmittance distribution in which transmittance of each region can take either almost 0 or almost 1 may be employed. In the binary-scale transmittance distribution, each region allows transmission of a large part of light of at least two wavelength ranges among wavelength ranges included in the target wavelength range and does not allow transmission of a large part of light of a remaining wavelength range. The "large part" refers to approximately 80% or more.

A certain cell among all cells, for example, a half of all the cells may be replaced with a transparent region. Such a transparent region allows transmission of light of all of the wavelength bands $W_1$ to $W_N$ included in the target wavelength range W at equally high transmittance, for example, transmittance of 80% or more. In such a configuration, transparent regions can be, for example, disposed in a checkerboard pattern. That is, a region in which light transmittance varies depending on a wavelength and a transparent region can be alternately arranged in two alignment directions of the regions of the filter array 110.

Data indicative of such a spatial distribution of spectral transmittance of the filter array 110 is acquired in advance on the basis of design data or actual calibration and is stored in a storage medium included in the processing apparatus 200. This data is used for arithmetic processing which will be described later.

The filter array 110 can be, for example, constituted by a multi-layer film, an organic material, a diffraction grating structure, or a microstructure containing a metal. In a case where a multi-layer film is used, for example, a dielectric multi-layer film or a multi-layer film including a metal layer can be used. In this case, the filter array 110 is formed so that at least one of a thickness, a material, and a laminating order of each multi-layer film varies from one cell to another. This can realize spectral characteristics that vary from one cell to another. Use of a multi-layer film can realize sharp rising and falling in spectral transmittance. A configuration using an organic material can be realized by varying contained pigment or dye from one cell to another or laminating different kinds of materials. A configuration using a diffraction grating structure can be realized by providing a diffraction structure having a diffraction pitch or depth that varies from one cell to another. In a case where a microstructure containing a metal is used, the filter array 110 can be produced by utilizing dispersion of light based on a plasmon effect.

Reconstruction of Hyperspectral Image

Next, an example of signal processing performed by the processing apparatus 200 is described. The processing apparatus 200 generates the multiple-wavelength hyperspectral image 220 on the basis of the compressed image 10 output from the image sensor 160 and spatial distribution characteristics of transmittance for each wavelength of the filter array 110. The "multiple-wavelength" means, for example, a larger number of wavelength ranges than wavelength ranges of three colors of R, G, and B acquired by a general color camera. The number of wavelength ranges can be, for example, 4 to approximately 100. The number of wavelength ranges is referred to as "the number of bands". The number of bands may be larger than 100 depending on intended use.

Data to be obtained is data of the hyperspectral image 220, which is expressed as f. The data f is data unifying image data $f_1$ corresponding to the wavelength band $W_1$, image data $f_2$ corresponding to the wavelength band $W_2, \ldots$, and image data $f_N$ corresponding to the wavelength band $W_N$ where N is the number of bands. It is assumed here that a lateral direction of the image is an x direction and a longitudinal direction of the image is a y direction, as illustrated in FIG. 1A. Each of the image data $f_1, f_2, \ldots$, and $f_N$ is two-dimensional data including v×u pixel values corresponding to v×u pixels where v is the number of pixels of the image data to be obtained in the x direction and u is the number of pixels of the image data to be obtained in the y direction. Accordingly, the data f is three-dimensional data that has v×u×N elements. This three-dimensional data is referred to as "hyperspectral image data" or a "hyperspectral data cube". Meanwhile, data g of the compressed image 120 acquired by coding and multiplexing by the filter array 110 is two-dimensional data including v×u pixel values corresponding to v×u pixels. The data g can be expressed by the following formula (1).

$$g = Hf = H \begin{bmatrix} f_1 \\ f_2 \\ \vdots \\ f_N \end{bmatrix} \quad (1)$$

g included in the formulas (1) and (2) is sometimes expressed as g in descriptions related to the formulas (1) and (2).

In the formula (1), each of $f_1, f_2, \ldots$, and $f_N$ is expressed as a one-dimensional vector of v×u rows and 1 column. Accordingly, a vector of the right side is a one-dimensional vector of v×u×N rows and 1 column. In the formula (1), the data g of the compressed image 120 is expressed as a one-dimensional vector of v×u rows and 1 column. A matrix H represents conversion of performing coding and intensity modulation of components $f_1, f_2, \ldots$, and $f_N$ of the vector f by using different pieces of coding information for the respective wavelength bands and adding results thus obtained. Accordingly, H is a matrix of v×u rows and v×u×N columns.

It seems that when the vector g and the matrix H are given, f can be calculated by solving an inverse problem of the formula (1). However, since the number of elements v×u×N of the data f to be obtained is larger than the number of elements v×u of the acquired data g, this problem is an ill-posed problem and cannot be solved. In view of this, the processing apparatus 200 finds a solution by using a method of compressed sensing while utilizing redundancy of the images included in the data f. Specifically, the data f to be obtained is estimated by solving the following formula (2).

$$f' = \mathrm{argmin}_{f}\{\|g - Hf\|_{l_2} + \tau\Phi(f)\} \quad (2)$$

In the formula (2), f represents the estimated data f. The first term in the parentheses in the above formula represents a difference amount between an estimation result Hf and the acquired data g, that is, a residual term. Although a sum of squares is a residual term in this formula, an absolute value, a square-root of sum of squares, or the like may be a residual term. The second term in the parentheses is a regularization term or a stabilization term. The formula (2) means that f that minimizes a sum of the first term and the second term is found. The processing apparatus 200 can calculate the final solution f by convergence of solutions by recursive iterative operation.

The first term in the parentheses in the formula (2) means operation of finding a sum of squares of a difference between the acquired data g and Hf obtained by converting f in the estimation process by the matrix H. $\Phi(f)$ in the second term is a constraint condition in regularization of f and is a function reflecting sparse information of the estimated data. This function brings an effect of smoothing or stabilizing the estimated data. The regularization term can be, for example, expressed by discrete cosine transform (DCT), wavelet transform, Fourier transform, total variation (TV), or the like of f. For example, in a case where total variation is used, stable estimated data with suppressed influence of noise of the observed data g can be acquired. Sparsity of the target 70 in a space direction of the regularization term varies depending on texture of the target 70. A regularization term that makes the texture of the target 70 more sparse in the space direction of the regularization term may be selected. Alternatively, regularization terms may be included in calculation. $\tau$ is a weight coefficient. As the weight coefficient $\tau$ becomes larger, an amount of reduction of redundant data becomes larger, and a compression rate increases. As the weight coefficient $\tau$ becomes smaller, convergence to a solution becomes weaker. The weight coefficient $\tau$ is set to such a proper value that f converges to a certain extent and is not excessively compressed.

Note that in the examples of FIG. 1B and FIG. 1C, an image coded by the filter array 110 is acquired in a blurred state on the imaging surface of the image sensor 160. Therefore, the hyperspectral image 220 can be generated by holding the blur information in advance and reflecting the blur information in the matrix H. The blur information is expressed by a point spread function (PSF). The PSF is a function that defines a degree of spread of a point image to surrounding pixels. For example, in a case where a point image corresponding to 1 pixel on an image spreads to a region of k×k pixels around the pixel due to blurring, the PSF can be defined as a coefficient group, that is, as a matrix indicative of influence on luminance of each pixel within the region. The hyperspectral image 220 can be generated by reflecting influence of blurring of a coding pattern by the PSF in the matrix H. Although the filter array 110 can be disposed at any position, a position where the coding pattern of the filter array 110 does not disappear due to excessive spread can be selected.

By the above processing, the hyperspectral image 220 can be generated on the basis of the compressed image 120 acquired by the image sensor 160. The processing apparatus 200 generates and outputs the hyperspectral image 220 by applying a compressed sensing algorithm for all bands included in the target wavelength range. Specifically, the processing apparatus 200 causes the image sensor 160 to detect light reflected by the target 70 through the filter array 110 and thereby generate and output an image signal. The processing apparatus 200 generates the spectral image $220W_1$ to the spectral image $200W_N$ on the basis of the image signal and N pieces of mask data corresponding to N wavelength bands obtained from the filter array 110 and outputs the spectral image $220W_1$ to the spectral image $200W_N$.

The N pieces of mask data may be first mask data $H_1, \ldots$, i-th mask data $H_i, \ldots$, j-th mask data $H_j, \ldots$, and N-th mask data $H_N$.

$H = (H_1 \ldots H_i \ldots H_j \ldots H_N)$, and each of the first mask data $H_1$, . . . , i-th mask data $H_i$, . . . , j-th mask data $H_j$, . . . , and N-th mask data $H_N$ may be a submatrix of v×u rows and v×u columns. The i-th mask data $H_i$ and the j-th mask data $H_j$ are exemplified by the formula (7).

$$H_i = \begin{bmatrix} i_{11} & \cdots & i_{1(v \times u)} \\ \vdots & \ddots & \vdots \\ i_{(v \times u)1} & \cdots & i_{(v \times u)(v \times u)} \end{bmatrix} \tag{7}$$

$$H_j = \begin{bmatrix} j_{11} & \cdots & j_{1(v \times u)} \\ \vdots & \ddots & \vdots \\ j_{(v \times u)1} & \cdots & j_{(v \times u)(v \times u)} \end{bmatrix}$$

Randomness of Mask Data in Wavelength Direction

Next, randomness of the mask data of the filter array 110 in a wavelength direction is described. In the following description, the target wavelength range includes N wavelength bands. For easier explanation, it is assumed that the N wavelength bands are given numbers in an ascending order of a central wavelength. A wavelength band having a shorter central wavelength is given a smaller number. The N wavelength bands may be given numbers in a descending order of a central wavelength. However, such numbering of the wavelength bands is not essential.

The randomness of the mask data in the wavelength direction is evaluated by using a correlation coefficient $r_{ij}$ between i-th mask data concerning an i-th wavelength band and j-th mask data concerning a j-th wavelength band where i and j are integers greater than or equal to 1 and less than or equal to N. The image sensor 160 detects only light corresponding to a certain wavelength band among the N wavelength bands and outputs mask data according to a pixel value distribution corresponding to the wavelength band. In a case where only light corresponding to a certain wavelength band is detected by the image sensor 160, light of a wavelength that is shifted by several nm from a wavelength range corresponding to the certain wavelength band may be incident. That is, light of a wavelength shorter by several nm than a lower limit of the wavelength range corresponding to the certain wavelength band or light of a wavelength longer by several nm than an upper limit of the wavelength range corresponding to the certain wavelength band may be incident on the image sensor 160. In this way, the i-th and j-th mask data can be acquired.

The correlation coefficient $r_{ij}$ is expressed by the following formula (3) as a two-dimensional correlation coefficient.

$$r_{ij} = \left| \frac{\sum_m \sum_n (i_{mn} - i_0)(j_{mn} - j_0)}{\sqrt{\left( \sum_m \sum_n (i_{mn} - i_0)^2 \right)\left( \sum_m \sum_n (j_{mn} - j_0)^2 \right)}} \right| \tag{3}$$

The correlation coefficient $r_{ij}$ expressed by the formula (3) is an index indicative of a degree of similarity between mask data of the wavelength band i and mask data of the wavelength band j. As the similarity becomes higher, the correlation coefficient $r_{ij}$ becomes closer to 1, and in a case where the mask data of the wavelength band i and the mask data of the wavelength band j completely match, the correlation coefficient $r_{ij}$ is 1. On the contrary, as the similarity becomes lower, the correlation coefficient $r_{ij}$ becomes closer to 0, and in a case where there is no correlation, the correlation coefficient $r_{ij}$ is 0.

The correlation coefficient $r_{ij}$ expressed by the formula (3) is calculated on the basis of v×u×v×u components included in the i-th mask data corresponding to the i-th wavelength band, that is, a matrix $H_i$ and v×u×v×u components included in the j-th mask data corresponding to the j-th wavelength band, that is, a matrix $H_j$. In the formula (3), $i_{mn}$ is a (m, n) component included in the i-th mask data $H_i$, that is, the matrix $H_i$. In the formula (3), $j_{mn}$ is a (m, n) component included in the j-th mask data $H_j$, that is, the matrix $H_j$. $i_0$ is an average of all components included in the i-th mask data, that is, the matrix $H_i$. That is, $i_0 = (i_{11} + \ldots + i_{(v \times u)(v \times u)})/(v \times u \times v \times u)$. $j_0$ is an average of all components included in the j-th mask data, that is, the matrix $H_j$. That is, $j_0 = (j_{11} + \ldots + j_{(v \times u)(v \times u)})/(v \times u \times v \times u)$.

A correlation coefficient $r_{11}$, . . . , the correlation coefficient $r_{ij}$, . . . , a correlation coefficient $r_{NN}$ may be expressed by a matrix R indicated by the formula (8).

$$R = \begin{bmatrix} r_{11} & \cdots & r_{1N} \\ \vdots & \ddots & \vdots \\ r_{N1} & \cdots & r_{NN} \end{bmatrix} \tag{8}$$

$r_{11} = 1$, $r_{22} = 1$, . . . , $r_{NN} = 1$. $r_{ij}$ (i≠j) expresses a degree of similarity between the i-th mask data $H_i$ corresponding to the wavelength band i and the j-th mask data $H_j$ corresponding to the wavelength band j and contributes to wavelength resolution and reconstruction accuracy of a hyperspectral image. The following is established: $r_{ij} = r_{ji}$. In a case where the wavelength bands are given numbers in an ascending order of a central wavelength, the correlation coefficients $r_{ij}$ are arranged in the matrix R from left to right and up to down in an ascending order of a central wavelength of a wavelength band.

It may be interpreted that the i-th mask data $H_i$ indicates a transmittance distribution of the filter array 110 concerning light of the i-th wavelength band. It may be interpreted that the j-th mask data $H_j$ indicates a transmittance distribution of the filter array 110 concerning light of the j-th wavelength band.

The i-th mask data $H_i$, that is, the matrix $H_i$ may be a diagonal matrix.

It may be interpreted that $i_{11}$, which is a (1, 1) component included in the matrix $H_i$, is transmittance of a first optical filter included in the filter array 110 concerning light of the i-th wavelength band, $i_{22}$, which is a (2, 2) component included in the matrix $H_i$, is transmittance of a second optical filter included in the filter array 110 concerning light of the i-th wavelength band, . . . , and $i_{(v \times u)(v \times u)}$, which is a (v×u, v×u) component included in the matrix $H_i$ indicates transmittance of a (v×u)-th optical filter included in the filter array 110 concerning light of the i-th wavelength band.

The j-th mask data $H_j$, that is, the matrix $H_j$ may be a diagonal matrix.

It may be interpreted that $j_{11}$, which is a (1, 1) component included in the matrix $H_j$, indicates transmittance of the first optical filter included in the filter array 110 concerning light of the j-th wavelength band, $j_{22}$, which is a (2, 2) component included in the matrix $H_j$ indicates transmittance of the second optical filter included in the filter array 110 concerning light of the j-th wavelength band, . . . , and $j_{(v \times u)(v \times u)}$, which is a (v×u, v×u) component included in the matrix $H_j$ indicates transmittance of the (v×u)-th optical filter included in the filter array 110 concerning light of the j-th wavelength band.

It may be interpreted that $i_0 = (in_{11} + \ldots + i_{(v \times u)(v \times u)})/(v \times u \times v \times u)$, which is an average of all components included in the i-th mask data, that is, the matrix $H_i$ is an average of transmittances corresponding to the optical filters included in the filter array 110 concerning light of the i-th wavelength band. It may be interpreted that $j_0 = (j_{11} + \ldots + j_{(v \times u)(v \times u)})/(v \times u \times v \times u)$, which is an average of all components included in the j-th mask data, that is, the matrix $H_j$ is an average of transmittances corresponding to optical filters included in the filter array 110 concerning light of the j-th wavelength band.

Examples of a case where each of matrix $H_1, \ldots$, matrix $H_i, \ldots$, matrix $H_j, \ldots$, matrix $H_N$ is a diagonal matrix of $v \times u$ rows and $v \times u$ columns include a case where it is determined that crosstalk between a pixel (p, q) and a pixel (r, s) of the image sensor 160 during actual calibration for acquiring information concerning the matrix H and crosstalk between the pixel (p, q) and the pixel (r, s) of the image sensor 160 at a time when an end user images the subject 70 are identical ($1 \leq p$, $r \leq v$, $1 \leq q$, $s \leq u$, the pixel (p, q)≠the pixel (r, s)). Whether or not the condition concerning crosstalk is satisfied may be determined in consideration of an imaging environment including an optical lens and the like used during imaging or may be determined in consideration of whether or not image quality of each reconstructed image can accomplish an objective of the end user.

Figure 5:
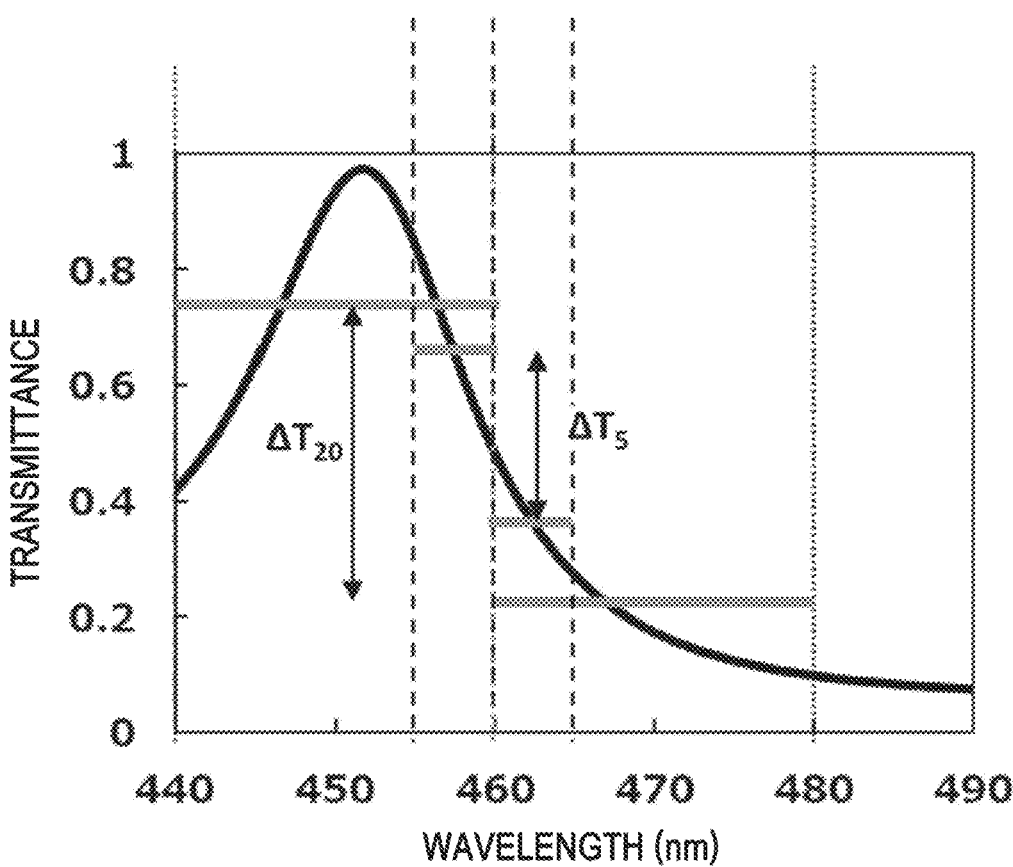
FIG. 5 is a graph illustrating transmission spectra of two optical filters included in a certain filter array.

Next, a difference in average transmittance between two adjacent wavelength bands is described with reference to FIG. 5. FIG. 5 is a graph illustrating a transmission spectrum of an optical filter included in a certain filter array 110. In the example illustrated in FIG. 5, in a case where each of two wavelength bands divided at 460 nm has wavelength resolution of 20 nm, a difference between average transmittance of the optical filter concerning a wavelength band greater than or equal to 440 nm and less than or equal to 460 nm and average transmittance of the optical filter concerning a wavelength band greater than or equal to 460 nm and less than or equal to 480 nm is expressed as $\Delta T_{20}$. In the example illustrated in FIG. 5, in a case where each of two wavelength bands divided at 460 nm has wavelength resolution of 5 nm, a difference between average transmittance of the optical filter concerning a wavelength band greater than or equal to 455 nm and less than or equal to 460 nm and average transmittance of the optical filter concerning a wavelength band greater than or equal to 460 nm and less than or equal to 465 nm is expressed as $\Delta T_5$. In the example illustrated in FIG. 5, $\Delta T_{20} > \Delta T_5$.

As illustrated in FIG. 5, a difference in average transmittance between two adjacent wavelength bands in an optical filter depends on wavelength resolution. The following can be basically said although there are differences based on transmission characteristics of an optical filter. Assume that a transmission peak of an optical filter is approximately expressed by a Lorenz function. In a case where wavelength resolution is approximately two times as large as a half width of the transmission peak of the optical filter, a difference in average transmittance between two adjacent wavelength bands is almost maximum. On the other hand, as the wavelength resolution becomes excessively wider than (three or more times as large as) or excessively narrower than (0.5 times as large as) the half width of the transmission peak of the optical filter, a difference in average transmittance between two adjacent wavelength bands becomes smaller.

The half width of the transmission peak of the optical filter may be $|\lambda 2 - \lambda 1|$ or $|\lambda 4 - \lambda 3|$.

Figure 10:
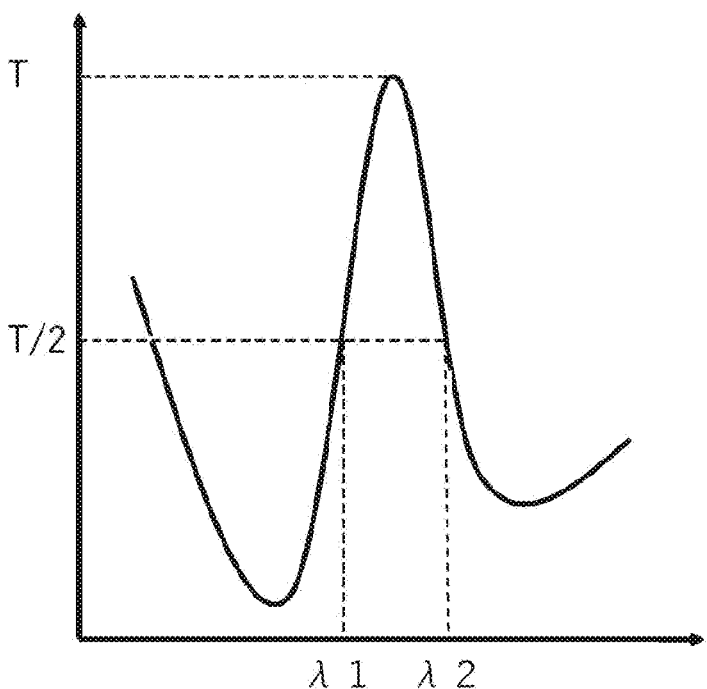
FIG. 10 is a chart for explaining that a half width of a transmission peak of an optical filter is |λ2−λ1|.

FIG. 10 is a chart for explaining that the half width of the transmission peak of the optical filter is $|\lambda 2 - \lambda 1|$. The vertical axis of the graph illustrated in FIG. 10 represents transmittance of the optical filter, and the horizontal axis of the graph illustrated in FIG. 10 represents a wavelength. In FIG. 10, $\lambda 1$ is a wavelength corresponding to T/2, $\lambda 2$ is a wavelength corresponding to T/2, and T is a peak value of transmittance of the optical filter.

Figure 11:
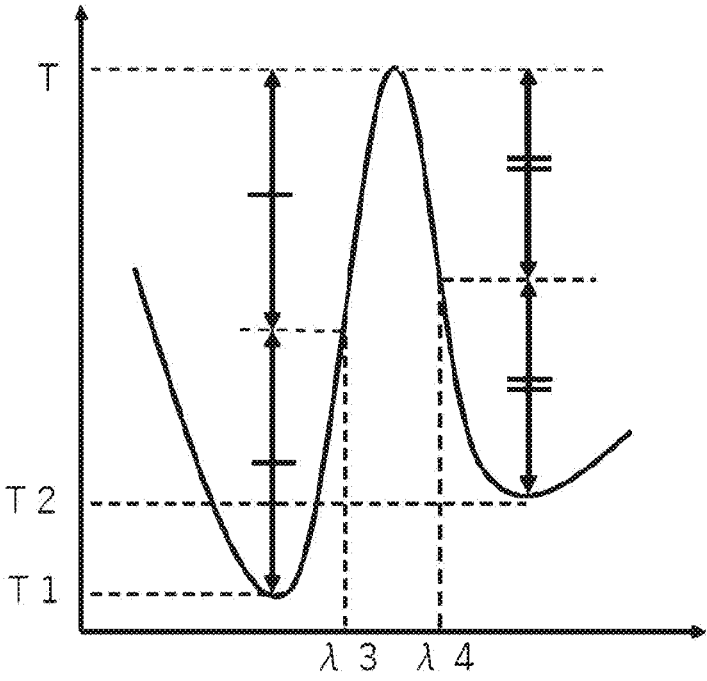
FIG. 11 is a chart for explaining that a half width of a transmission peak of an optical filter is |λ4−λ3|.

FIG. 11 is a chart for explaining that the half width of the transmission peak of the optical filter is $|\lambda 2 - \lambda 3|$. The vertical axis of the graph illustrated in FIG. 11 represents transmittance of the optical filter, and the horizontal axis of the graph illustrated in FIG. 11 represents a wavelength. In FIG. 11, $\lambda 3$ is a wavelength corresponding to $(T-T1)/\lambda 24$ is a wavelength corresponding to $(T-T2)/2$, T is a local maximum value of transmittance of the optical filter, T1 is a first local minimum value adjacent to the local maximum value T, and T2 is a second local minimum value adjacent to the local maximum value T.

As a difference in average transmittance between two adjacent wavelength bands becomes larger, mask data of the two wavelength bands are "less similar", and $r_{ij}$ (i≠j) of the matrix R becomes closer to 0. In a case where $r_{ij}$ (i≠j) of the matrix R is sufficiently small, the i-th wavelength band and the j-th wavelength band can be separated. That is, it can be said that the "wavelengths" are "separable". In a case where $r_{ij}$ (i≠j) of the matrix R is sufficiently small, the $r_{ij}$ (i≠j) is, for example, 0.8 or less.

In view of the above, the filter array 110 may be designed in accordance with desired wavelength resolution or the wavelength resolution may be determined in accordance with design of the filter array 110. In the present embodiment, the filter array 110 is designed in accordance with desired wavelength resolution, as described below.

Figure 6A:
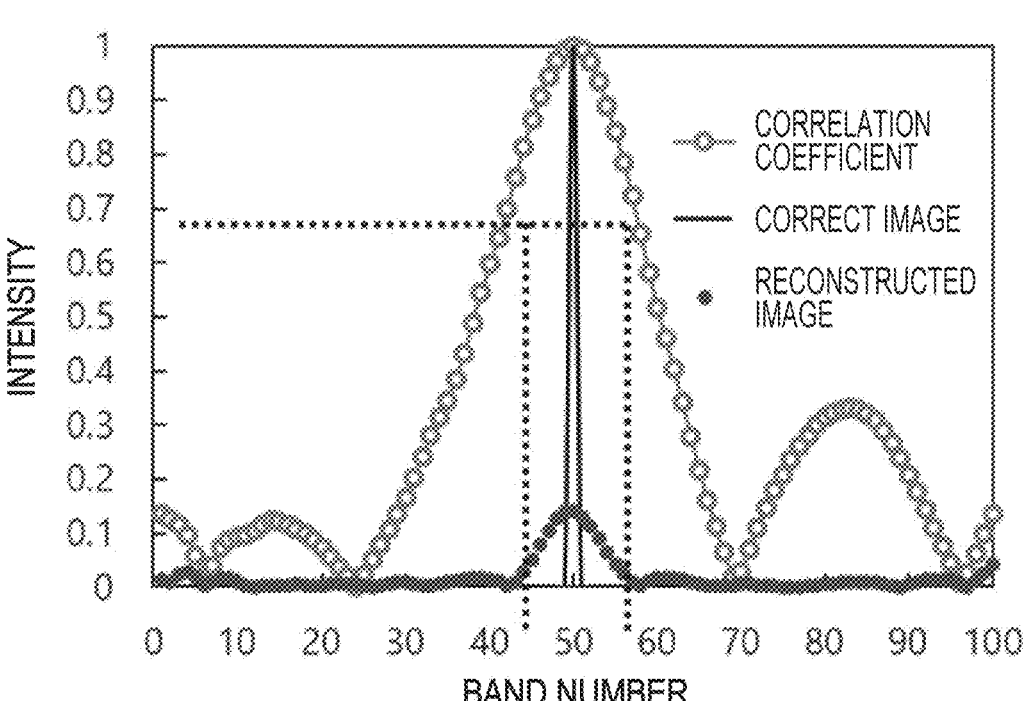
FIG. 6A is a graph illustrating a correlation coefficient, a spectrum of a correct image, and a spectrum of a reconstructed image.

Next, a condition on which the i-th wavelength band and the j-th wavelength band corresponding to $r_{ij}$ (i≠j) of the matrix R are separable is described with reference to FIGS. 6A and 6B. FIG. 6A is a graph illustrating a correlation coefficient, a spectrum of a correct image, and a spectrum of a reconstructed image in a case where a hyperspectral image concerning 100 wavelength bands within a target wavelength range is generated by using a certain filter array 110. The correlation coefficient is $r_{ij}$ with respect to the fiftieth wavelength band where i=50 and $1 \leq j \leq 100$. The spectrum of the correct image exhibits an intensity of 1 in the fiftieth wavelength band and exhibits an intensity of zero in remaining 99 wavelength bands. An intensity of the correct image in each wavelength band is a value obtained by dividing an average of intensities of all pixels included in the correct image by a maximum intensity that can be observed (an intensity 255 in an 8-bit image). An intensity 1 corresponds to white, and an intensity zero corresponds to black. The solid line illustrated in FIG. 6A represents the spectrum of the correct image, the black circles represent the spectrum of the reconstructed image, and the white circles represent the correlation coefficient.

As illustrated in FIG. 6A, the spectrum of the correct image exhibits a non-zero pixel value only in the fiftieth wavelength band, whereas the spectrum of the reconstructed image exhibits a non-zero intensity not only in the fiftieth wavelength band, but also in surrounding bands. An intensity of the reconstructed image in each wavelength band is an average of intensities of all pixels included in the reconstructed image. As is clear from the correlation function illustrated in FIG. 6A, a reason why the spectrum of the reconstructed image exhibits such an intensity is that mask data concerning the fiftieth wavelength band and mask data concerning the surrounding wavelength bands are similar. As a result, an intensity that should be allocated to the fiftieth wavelength band is erroneously allocated to the surrounding wavelength bands.

Figure 6B:
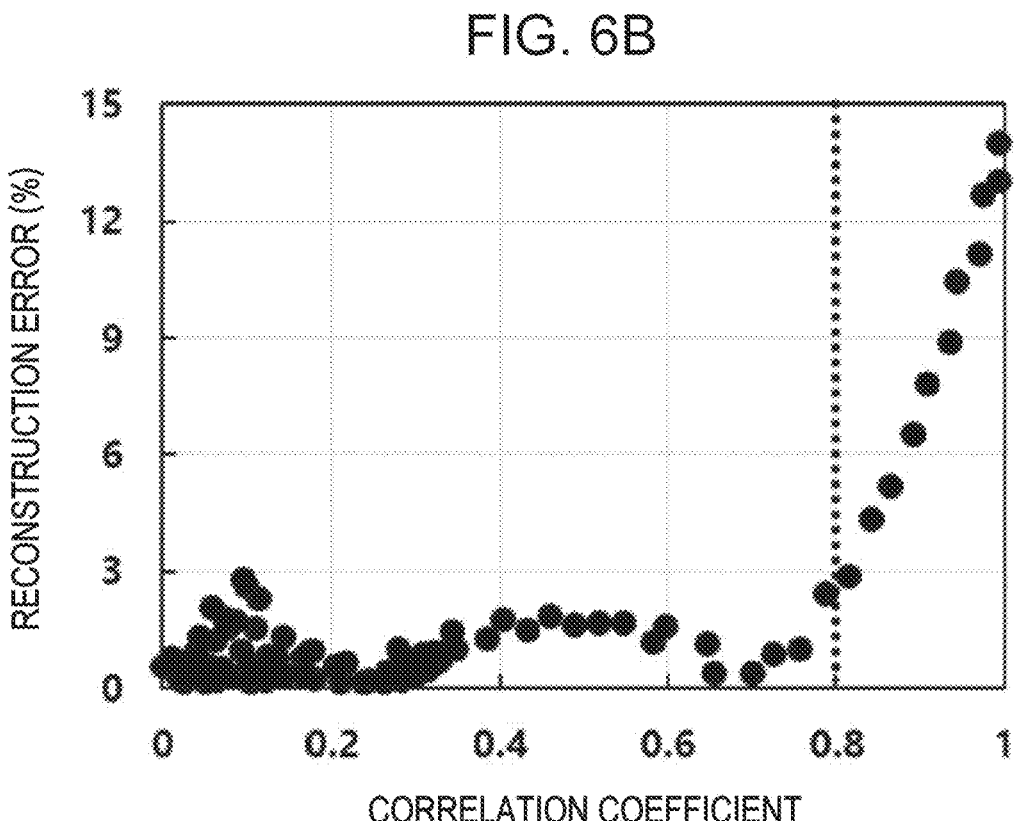
FIG. 6B is a graph in which relationships between correlation coefficients and reconstruction errors are plotted.

FIG. 6B is a graph in which relationships between correlation coefficients concerning the 99 wavelength bands other than the fiftieth wavelength band and reconstruction errors are plotted from the result illustrated in FIG. 6A. As for the 99 wavelength bands other than the fiftieth wavelength band, the intensity of the reconstructed image is a reconstruction error since the intensity of the correct image is 0. That is, in a case where an average pixel value of an 8-bit reconstructed image is x, the reconstruction error is $x/255 \times 100$ (%). In a case where the correlation coefficient is 0.8 or less, the reconstruction error is 3% or less. On the other hand, in a case where the correlation coefficient is 0.8 or more, the reconstruction error rapidly increases as the correlation coefficient increases. For example, in a case where the correlation coefficient is 0.9, the reconstruction error is approximately 7%. The rapid increase in reconstruction error means that pieces of mask data whose correlation coefficient is 0.8 or more strongly influence each other's calculation results. In the example illustrated in FIG. 6A, a spectrum of a correct reconstructed image is supposed to exhibit an intensity of zero in the wavelength bands other than the fiftieth wavelength band. Actually, mask data of the fiftieth wavelength band and mask data of the surrounding wavelength bands influence each other, and as a result the spectrum of the reconstructed image exhibits an intensity of approximately 0.07 in the surrounding bands.

As illustrated in FIG. 6A, similarity of mask data between two wavelength bands can be calculated on the basis of a correlation coefficient. As illustrated in FIG. 6B, pieces of mask data whose correlation coefficient is 0.8 or more are similar to each other and influence each other's calculation results.

As described above, it seems that the correlation function of the mask data of the filter array 110 desirably satisfies $r_{ij} \leq 0.8$ in a case where $|i-j| \geq 1$ from a perspective of improving reconstruction accuracy of a hyperspectral image. In other words, it seems that randomness of the mask data of the filter array 110 in the wavelength direction is desirably high.

However, a spectrum of an actual target often gradually changes unlike the spectrum of the correct image illustrated in FIG. 6A. Such a gradual change includes many low-frequency components and includes almost no high-frequency component. That is, an actual target often has sparsity in a wavelength direction. The inventors of the present invention found that a hyperspectral image of an actual target can be generated accurately in a case where randomness of the mask data of the filter array 110 in the wavelength direction is lessened from complete randomness to a certain extent.

Figure 7A:
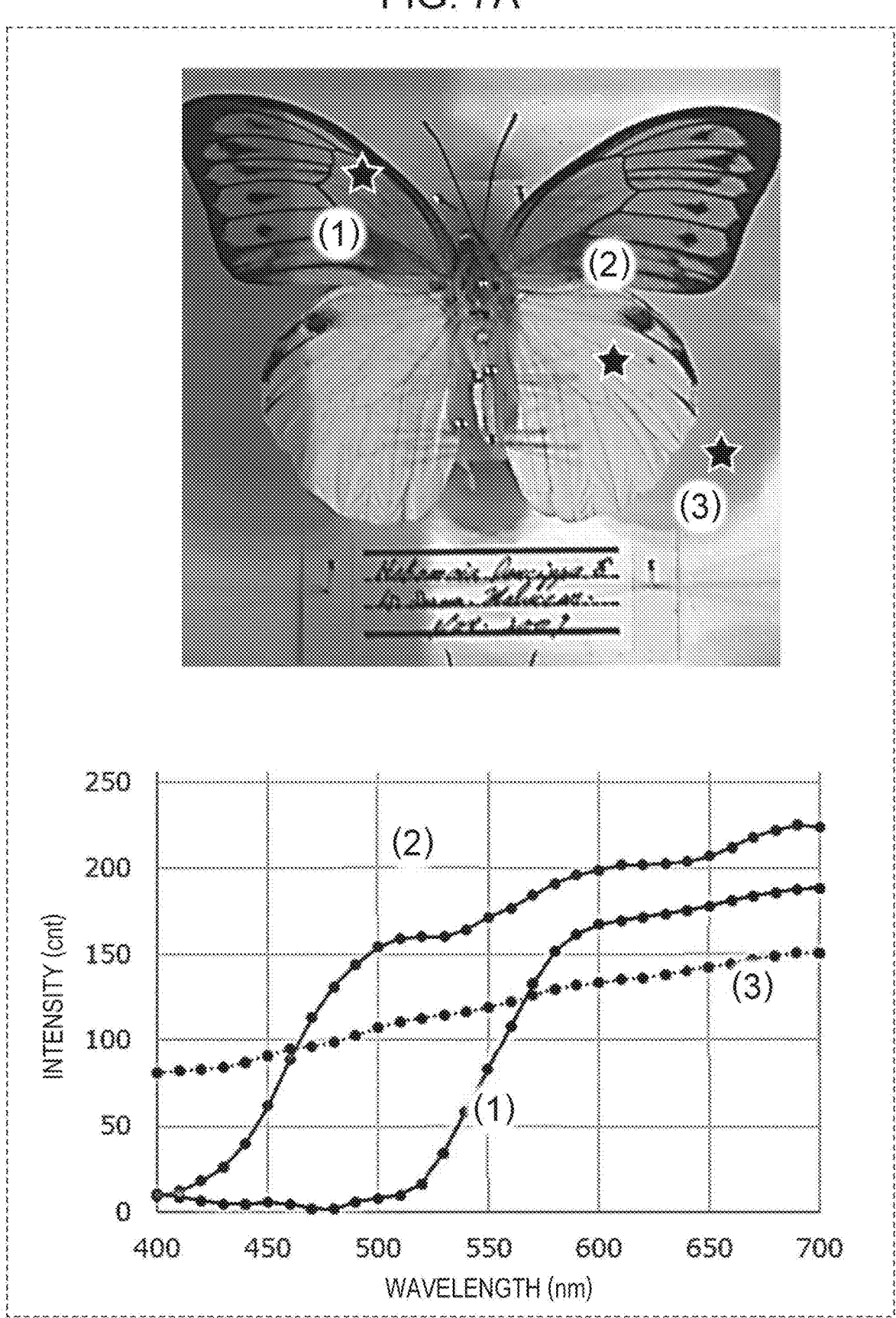
FIG. 7A illustrates a first example of a target and a spectrum of the target.
Figure 7B:
FIG. 7B illustrates a second example of a target and a spectrum of the target.
Figure 7B:
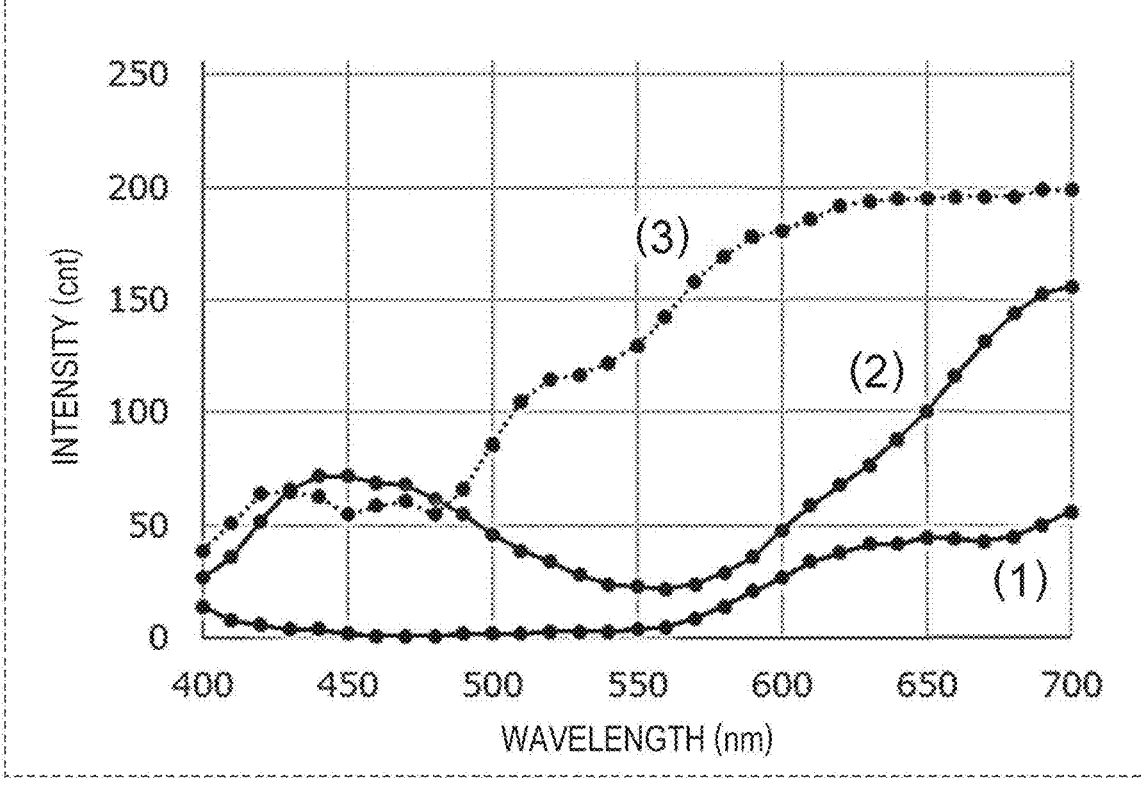
Figure 7C:
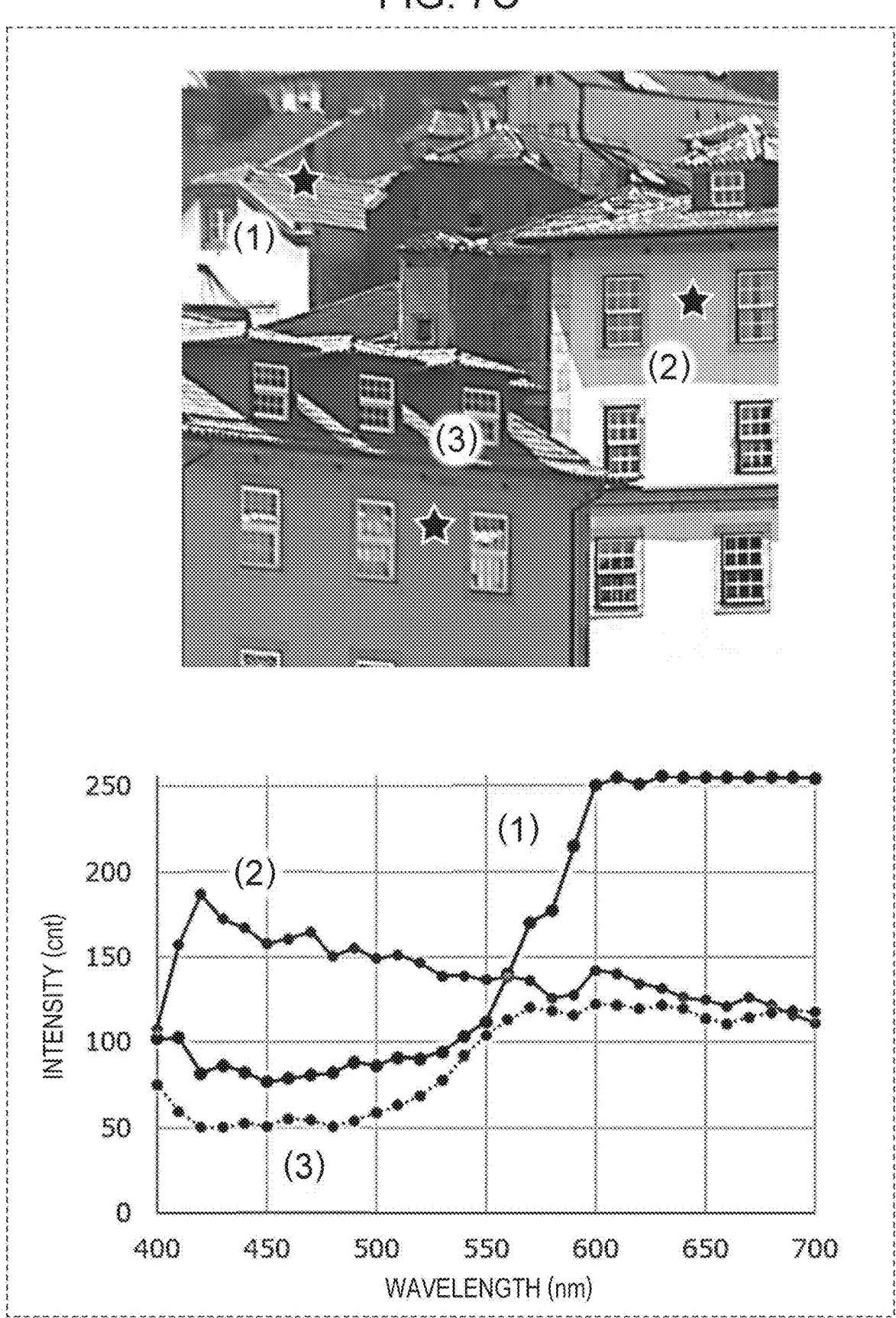
FIG. 7C illustrates a third example of a target and a spectrum of the target.

Next, sparsity of an actual target in a wavelength direction is described with reference to FIGS. 7A to 7C. FIGS. 7A to 7C each illustrate a target and an example of a spectrum of the target. The upper drawings in FIGS. 7A to 7C are photographs of targets, and the lower drawings in FIGS. 7A to 7C illustrate spectra at observation points of the targets given numbers. The targets illustrated in FIGS. 7A to 7C are a butterfly, flowers, and buildings, respectively. At any observation point of any target, a spectrum gradually changes. That is, an actual target often has sparsity in a wavelength direction.

An actual target also often has sparsity in a space direction. Patent Literatures 1 and 2 disclose a method for generating a hyperspectral image on the basis of sparsity in a space direction. In the method, the sparsity in the space direction is considered as the regularization term $\Phi(f)$ in the evaluation function expressed by the formula (2).

The sparsity in the space direction and the sparsity in the wavelength direction can also be considered as the regularization term $\Phi(f)$ of the evaluation function. However, in a case where both the sparsity in the space direction and the sparsity in the wavelength direction are considered as the regularization term $\Phi(f)$, a calculation period increases. In view of this, in the present embodiment, the sparsity in the space direction is considered as the regularization term $\Phi(f)$ of the evaluation function, and the sparsity in the wavelength direction is introduced as the mask data of the filter array 110.

Figure 8A:
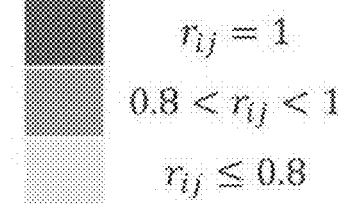
FIG. 8A illustrates correlation functions of mask data in which sparsity in a wavelength direction is reflected.
Figure 8B:
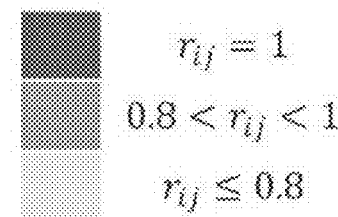
FIG. 8B illustrates correlation functions of mask data in which sparsity in a wavelength direction is not reflected.

Next, how presence or absence of the sparsity of the mask data in the wavelength direction influences reconstruction accuracy in reconstruction processing in which the sparsity in the space direction is considered as the regularization term $\Phi(f)$ of the evaluation function is described with reference to FIGS. 8A to 8C. FIGS. 8A and 8B illustrate correlation functions of mask data in which the sparsity in the wavelength direction is reflected and correlation functions of mask data in which the sparsity in the wavelength direction is not reflected, respectively. The correlation functions are expressed as a matrix. In FIGS. 8A and 8B, the deepest color expresses $r_{ij}=1$, the second deepest color expresses $0.8 < r_{ij} < 1.0$, and the palest color expresses $r_{ij} < 0.8$.

In the mask data illustrated in FIG. 8A, in a case where $|i-j|=1$, $0.8 < r_{ij} < 1.0$, and in a case where $|i-j| > 2$, $r_{ij} < 0.8$. The correlation function of the mask data illustrated in FIG. 8A gradually decreases as $|i-j|$ increases. Accordingly, the sparsity in the wavelength direction is reflected in the mask data illustrated in FIG. 8A.

Meanwhile, in the mask data illustrated in FIG. 8B, in a case where $|i-j| > 1$, $r_{ij} < 0.8$. The correlation function of the mask data illustrated in FIG. 8B rapidly decreases as $|i-j|$ increases. Accordingly, the sparsity in the wavelength direction is not reflected in the mask data illustrated in FIG. 8B.

Figure 8C:
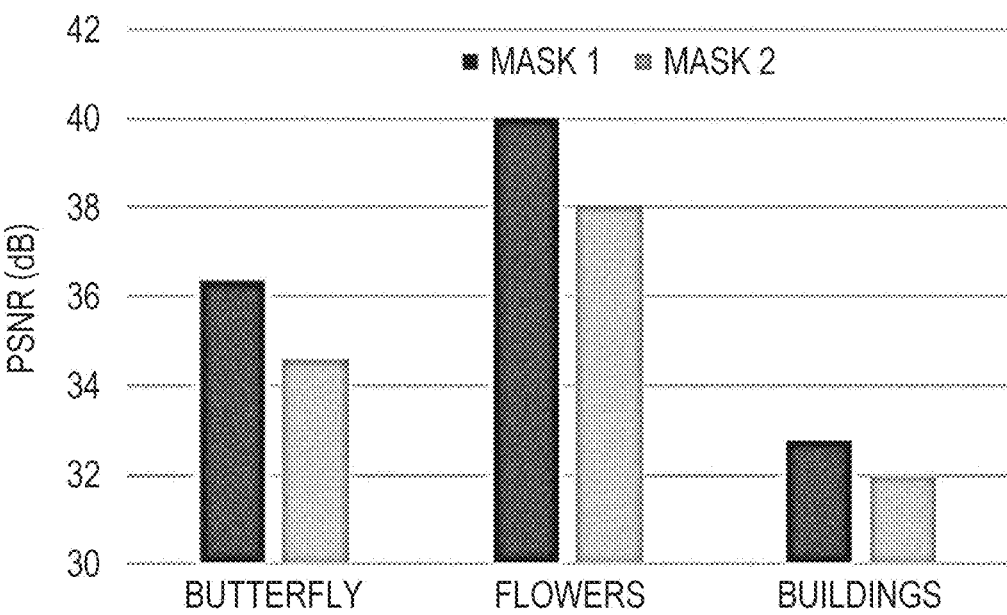
FIG. 8C illustrates reconstruction accuracy of hyperspectral images of targets generated by using the mask data illustrated in FIGS. 8A and 8B.

FIG. 8C illustrates reconstruction accuracy of hyperspectral images of the targets generated on the basis of the mask data illustrated in FIGS. 8A and 8B in the reconstruction processing in which the sparsity in the space direction is considered as the regularization term $\Phi(f)$ of the evaluation function. Masks 1 and 2 illustrated in FIG. 8C represent the mask data illustrated in FIG. 8A and the mask data illustrated in FIG. 8B, respectively. The hyperspectral images are generated by reconstructing compressed images of the targets by using the masks 1 and 2. The targets are the butterfly, the flowers, and the buildings illustrated in FIGS. 7A to 7C. The reconstruction accuracy is expressed as a PSNR, and a higher PSNR indicates higher reconstruction accuracy.

As illustrated in FIG. 8C, higher reconstruction accuracy can be obtained for all the targets in a case where the mask 1 is used than in a case where the mask 2 is used. How much reconstruction accuracy is improved in a case where the mask 1 is used as compared with a case where the mask 2 is used varies depending on a target. This is because how much the sparsity in the wavelength direction contributes to reconstruction of a hyperspectral image varies depending on a target.

As illustrated in FIGS. 7A to 7C, correct images concerning at least two wavelength bands adjacent to each other are similar. In a case where mask data concerning all wavelength bands within the target wavelength range are similar to each other, it is not technically easy to acquire a hyperspectral image. Therefore, a requirement which a correlation function should satisfy from a perspective of improving reconstruction accuracy by incorporating the sparsity in the wavelength direction into the mask data of the filter array 110 is expressed by the following formula (4).

$$\begin{cases} r_{ij} \geq 0.8(|i-j| = 1) \\ r_{ij} \leq 0.8(\exists |i-j| \in l, 2 \leq l \leq N-1) \end{cases} \quad (4)$$

The correlation coefficient $r_{ij}$ satisfies $r_{ij} \geq 0.8$ in a combination of mask data in which $|i-j|$ is 1. Furthermore, the correlation coefficient $r_{ij}$ satisfies $r_{ij} \leq 0.8$ in at least one combination of mask data in which $|i-j|$ is greater than or equal to 2 and less than or equal to N-1. For example, combinations of mask data in which $|i-j|$ is 3 need not include a combination that satisfies $r_{ij} \leq 0.8$. Combinations of mask data in which $|i-j|$ is 2 may include only one combination that satisfies $r_{ij} \leq 0.8$.

In a more desirable example, mask data concerning wavelength bands that are close to a certain degree are similar to each other, and mask data concerning other wavelength bands are not similar to each other. This is because similarity of a target in a wavelength direction tends to be high concerning wavelength bands that are close to a certain degree and tends to be low concerning other wavelength bands. In such an example, a more desirable requirement which $r_{ij}$ should satisfy is expressed by the following formula (5).

$$\begin{cases} r_{ij} \geq 0.8 \quad (1 \leq |i-j| \leq k) \\ r_{ij} \leq 0.8 \quad (|i-j| \geq k+1) \end{cases} \quad (5)$$

In the formula (5), k is an integer that satisfies $1 \leq k \leq N-2$. In a combination of mask data in which $|i-j|$ is greater than or equal to 1 and less than and equal to k, the correlation coefficient $r_{ij}$ satisfies $r_{ij} \geq 0.8$. In a combination of mask data in which $|i-j|$ is greater than or equal to k+1, the correlation coefficient $r_{ij}$ satisfies $r_{ij} \leq 0.8$. For example, when k=2, the correlation coefficient $r_{ij}$ satisfies $r_{ij} \geq 0.8$ in all combinations of mask data in which $|i-j|$ is 2. Similarly, the correlation coefficient $r_{ij}$ satisfies $r_{ij} \geq 0.8$ in all combinations of mask data in which $|i-j|$ is 1. On the other hand, the correlation coefficient $r_{ij}$ satisfies $r_{ij} \leq 0.8$ in all combinations of mask data in which $|i-j|$ is greater than or equal to 3.

In an example in which sparsity in a wavelength direction which many targets have is universally reflected, only mask data concerning adjacent wavelength bands are similar to each other, and mask data concerning other wavelength bands are not similar to each other. In such an example, a requirement which $r_{ij}$ should satisfy is expressed by the following formula (6).

$$\begin{cases} r_{ij} \geq 0.8 \quad (|i-j| = 1) \\ r_{ij} \leq 0.8 \quad (|i-j| \geq 2) \end{cases} \quad (6)$$

In a combination of mask data in which $|i-j|$ is 1, the correlation coefficient rij satisfies $r_{ij} \geq 0.8$. Furthermore, in all combinations of mask data in which $|i-j|$ is greater than or equal to 2, the correlation coefficient $r_{ij}$ satisfies $r_{ij} \leq 0.8$. The formula (6) corresponds to a case where k=1 in the formula (5).

By setting transmission characteristics of the filter array 110 and the wavelength resolution so that any one or more of the requirements expressed by the above formulas (4) to (6), reconstruction accuracy of a hyperspectral image of a target can be improved.

Next, a requirement that produces the effect more in the more desirable example is described with reference to FIGS. 9A to 9C. A correlation coefficient between spectral images concerning two wavelength bands can be calculated in the same way as a correlation coefficient between mask data of the filter array 110 concerning two wavelength bands can be calculated.

Figure 9A:
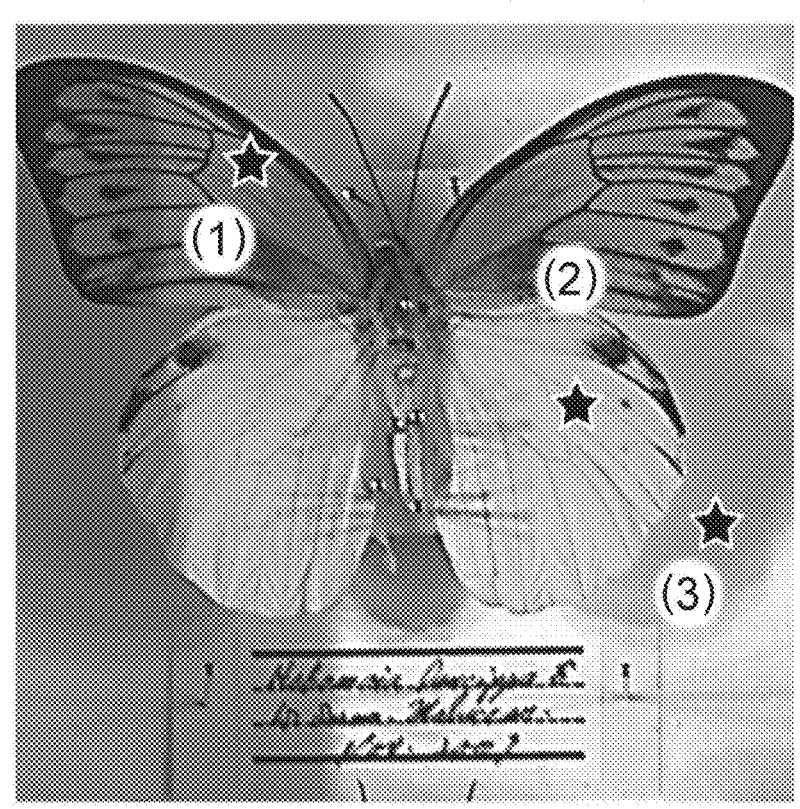
FIG. 9A illustrates the target illustrated in FIG. 7A and correlation functions of spectral images of the target.
Figure 9A:
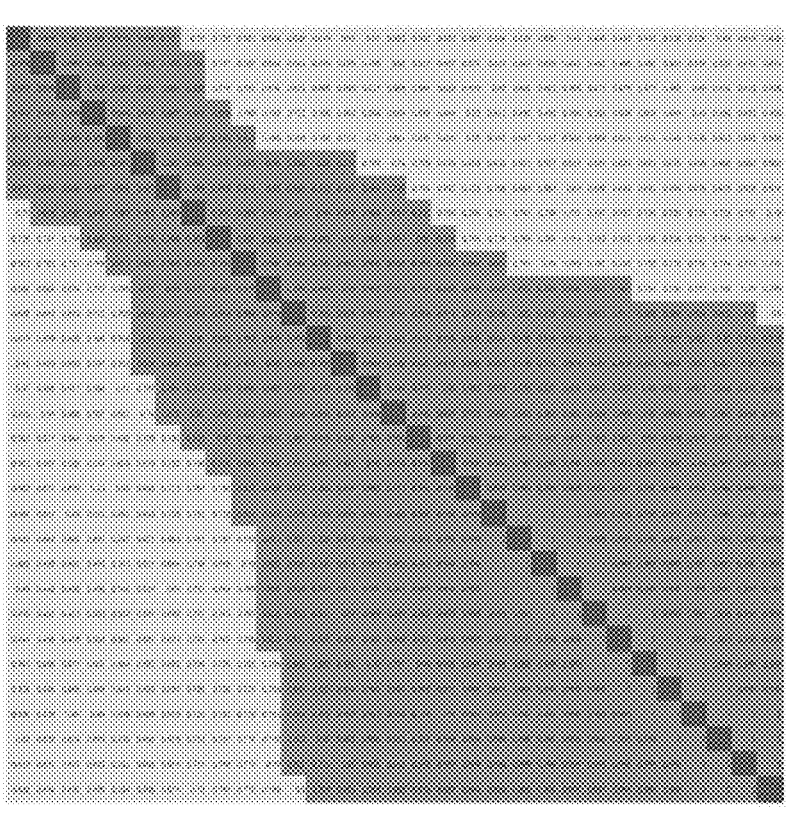
Figure 9B:
FIG. 9B illustrates the target illustrated in FIG. 7B and correlation functions of spectral images of the target.
Figure 9B:
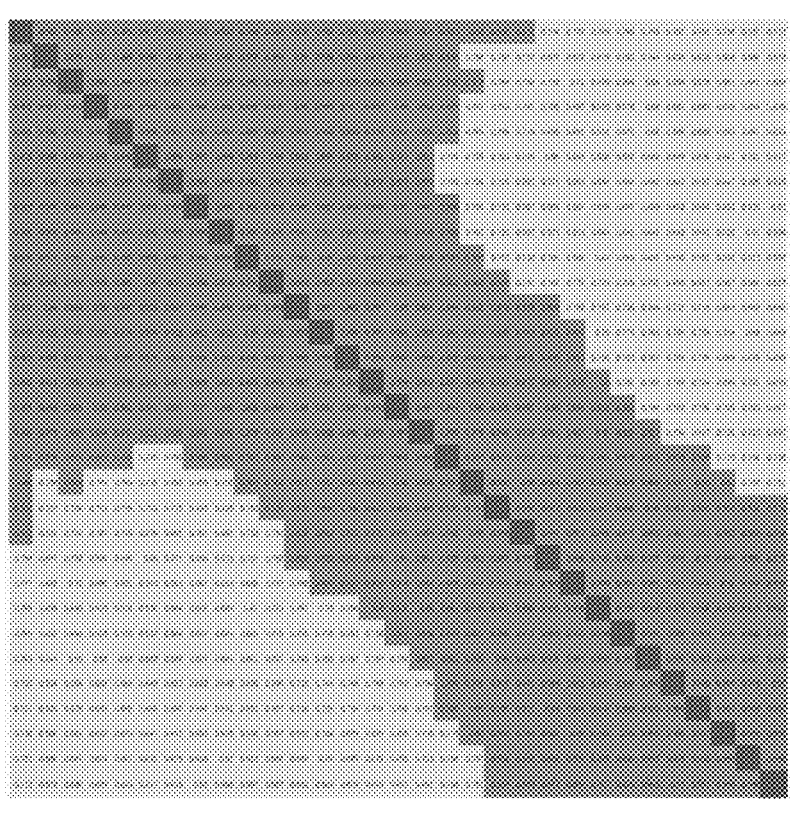
Figure 9C:
FIG. 9C illustrates the target illustrated in FIG. 7C and correlation functions of spectral images of the target.
Figure 9C:
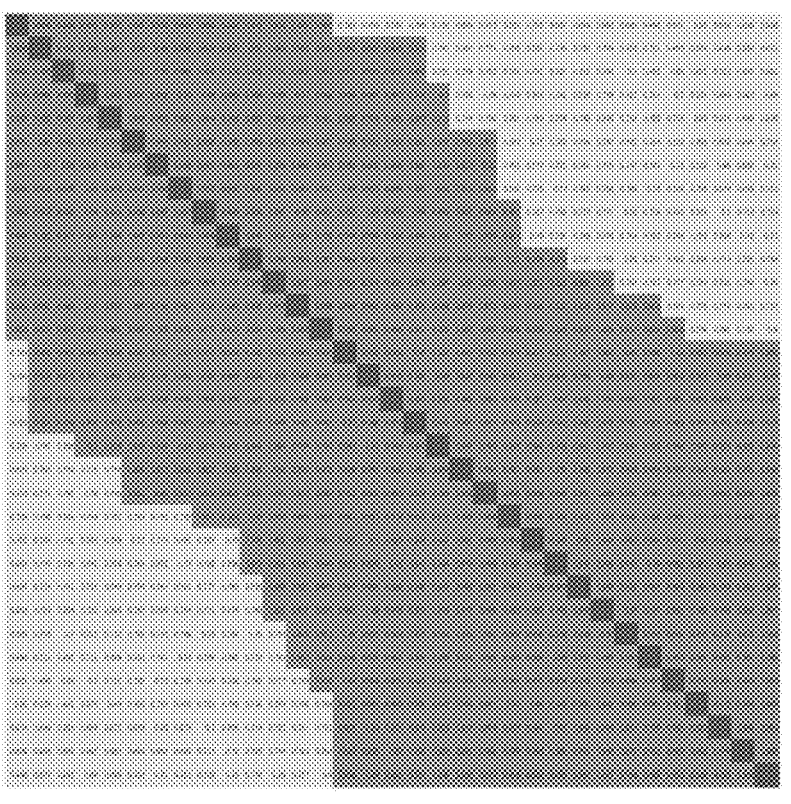

FIGS. 9A to 9C illustrate the targets illustrated in FIGS. 7A to 7C and correlation functions of spectral images of the targets, respectively. The correlation functions are expressed as a matrix. The color densities illustrated in FIGS. 9A to 9C are identical to those described with reference to FIGS. 8A and 8B.

As illustrated in FIGS. 9A to 9C, many non-diagonal components are similar to diagonal components since there is structural similarity of the targets concerning all wavelength bands unlike mask data. Accordingly, spectral images concerning wavelength bands that are close to a certain degree are similar. In a case where correct spectral images are not similar and mask data are similar concerning two wavelength bands, reconstruction accuracy is low. Accordingly, in a case where a correlation function between correct spectral images concerning two wavelength bands is equal to or less than 0.8, reconstruction accuracy can be improved as long as a correlation function between mask data concerning the two wavelength bands is equal to or less than 0.8. However, the opposite is not true. That is, even in a case where a correlation function between mask data concerning two wavelength bands is greater than or equal to 0.8, a correlation function between correct spectral images concerning the two wavelength bands need not be greater than or equal to 0.8.

In a case where a spectrum of a target is known, the mask data of the filter array 110 and the wavelength resolution can be properly designed by calculating a correlation coefficient between spectral images of the target as described above. In design of the filter array 110, a correlation function between mask data is decided on the basis of a correlation coefficient between spectral images of a target. For example, a correlation function between mask data may be set to almost match a correlation coefficient between spectral images of a target.

As described above, a method for manufacturing the filter array 110 according to the present embodiment includes calculating a correlation coefficient between spectral images of a target concerning all combinations of two different wavelength bands among N wavelength bands and designing mask data of the filter array 110 concerning each of the N wavelength bands on the basis of the correlation coefficient. The mask data of the filter array 110 may be replaced with a transmittance distribution of the filter array 110.

As described above, the correlation coefficient satisfies a relationship $r_{ij} = r_{ji}$. Therefore, the calculating the correlation coefficient $r_{ij}$ concerning all the combinations may include calculating a correlation coefficient concerning a combination that satisfies one of i>j and j>i where i≠j and using a result of the calculation as a correlation coefficient concerning a combination that satisfies the other one of i>j and j>i.

The technique of the present disclosure is, for example, useful for a camera and a measurement apparatus that acquire a multiple-wavelength or high-resolution image. The technique of the present disclosure is, for example, applicable to sensing for biological, medical, and cosmetic purposes, a food foreign substance/residual pesticide inspection system, a remote sensing system, and an on-board sensing system.

What is claimed is:

1. A device used in a system for generating spectral images corresponding to N wavelength bands where N is an integer greater than or equal to 4, the device comprising:

optical filters that are different from one another in spectral transmittance; and an image sensor that detects light that has passed through the optical filters, wherein the image sensor outputs i-th mask data corresponding to a pixel value distribution corresponding to an i-th wavelength band among the N wavelength bands by detecting only light corresponding to the i-th wavelength band where i is an integer greater than or equal to 1 and less than or equal to N and outputs j-th mask data corresponding to a pixel value distribution corresponding to a j-th wavelength band among the N wavelength bands by detecting only light corresponding to the j-th wavelength band where j is an integer greater than or equal to 1 and less than or equal to N, a correlation coefficient $r_{ij}$ between the i-th mask data and the j-th mask data is expressed as follows:

$$r_{ij} = \left| \frac{\sum_m \sum_n (i_{mn} - i_0)(j_{mn} - j_0)}{\sqrt{\left(\sum_m \sum_n (i_{mn} - i_0)^2\right)\left(\sum_m \sum_n (j_{mn} - j_0)^2\right)}} \right|$$

where $i_{mn}$ and $j_{mn}$ are a pixel value of a pixel at an m-th row and an n-th column of the i-th mask data and a pixel value of a pixel at an m-th row and an n-th column of the j-th mask data, respectively, $i_0$ and $j_0$ are an average of pixel values of the i-th mask data and an average of pixel values of the j-th mask data, respectively, and the N wavelength bands are given numbers in an ascending or descending order of a central wavelength, the correlation coefficient $r_{ij}$ satisfies $r_{ij} > 0.8$ in a combination of the i-th mask data and the j-th mask data in which $|i-j|$ is 1, and the correlation coefficient $r_{ij}$ satisfies $r_{ij} \leq 0.8$ in at least one combination of the i-th mask data and the j-th mask data in which $|i-j|$ is greater than or equal to 2 and less than or equal to N−1.

2. The device according to claim 1, wherein the correlation coefficient $r_{ij}$ satisfies $r_{ij} \geq 0.8$ in a combination of the i-th mask data and the j-th mask data in which $|i-j|$ is greater than or equal to 1 and less than or equal to k, and the correlation coefficient $r_{ij}$ satisfies $r_{ij} \leq 0.8$ in a combination of the i-th mask data and the j-th mask data in which $|i-j|$ is greater than or equal to k+1 where k is an integer that satisfies $1 \leq k \leq N-2$.

3. The device according to claim 2, wherein k=1.

4. A filter array used in a system for generating spectral images corresponding to N wavelength bands where N is an integer greater than or equal to 4, the filter array comprising optical filters that are different from one another in spectral transmittance, wherein a correlation coefficient $r_{ij}$ between an i-th transmittance distribution of the optical filters concerning light of an i-th wavelength band among the N wavelength bands where i is an integer greater than or equal to 1 and less than or equal to N and a j-th transmittance distribution of the optical filters concerning light of a j-th wavelength band among the N wavelength bands where j is an integer greater than or equal to 1 and less than or equal to N is expressed as follows:

$$r_{ij} = \left| \frac{\sum_m \sum_n (i_{mn} - i_0)(j_{mn} - j_0)}{\sqrt{\left(\sum_m \sum_n (i_{mn} - i_0)^2\right)\left(\sum_m \sum_n (j_{mn} - j_0)^2\right)}} \right|$$

where $i_{mn}$ and $j_{mn}$ are transmittance of an optical filter at an m-th row and an n-th column in the transmittance distribution of the optical filters concerning the light of the i-th wavelength band and transmittance of an optical filter at an m-th row and an n-th column in the transmittance distribution of the optical filters concerning the light of the j-th wavelength band, respectively, $i_0$ and $j_0$ are an average of transmittances of the i-th transmittance distribution and an average of transmittances of the j-th transmittance distribution, respectively, and the N wavelength bands are given numbers in an ascending or descending order of a central wavelength, the correlation coefficient $r_{ij}$ satisfies $r_{ij} \geq 0.8$ in a combination of the i-th transmittance distribution and the j-th transmittance distribution in which $|i-j|$ is 1, and the correlation coefficient $r_{ij}$ satisfies $r_{ij} \leq 0.8$ in at least one combination of the i-th transmittance distribution and the j-th transmittance distribution in which $|i-j|$ is greater than or equal to 2 and less than or equal to N−1.

5. A system for generating spectral images corresponding to N wavelength bands where N is an integer greater than or equal to 4, the system comprising:

the device according to claim 1; and a processing circuit, wherein the processing circuit causes the image sensor included in the device to detect light through the optical filters and thereby generate and output an image signal, and generates and outputs the spectral images on a basis of the image signal and N pieces of mask data corresponding to the N wavelength bands.

6. A method for manufacturing a filter array used in a system for generating spectral images corresponding to N wavelength bands where N is an integer greater than or equal to 4, the filter array including optical filters that are different from one another in spectral transmittance, the method comprising:

calculating a correlation coefficient between the spectral images of a target concerning all combinations of two different wavelength bands among the N wavelength bands; and designing a transmittance distribution of the optical filters for each of the N wavelength bands on a basis of the correlation coefficient, wherein in the calculating the correlation coefficient, the correlation coefficient is calculated such that a correlation coefficient $r_{ij}$ between an i-th transmittance distribution of the optical filters concerning light of an i-th wavelength band among the N wavelength bands where i is an integer greater than or equal to 1 and less than or equal to N and a j-th transmittance distribution of the optical filters concerning light of a j-th wavelength band among the N wavelength bands where j is an integer greater than or equal to 1 and less than or equal to N is expressed as follows:

$$r_{ij} = \left| \frac{\sum_m \sum_n (i_{mn} - i_0)(j_{mn} - j_0)}{\sqrt{\left(\sum_m \sum_n (i_{mn} - i_0)^2\right)\left(\sum_m \sum_n (j_{mn} - j_0)^2\right)}} \right|$$

where $i_{mn}$ and $i_{mn}$ are transmittance of an optical filter at an m-th row and an n-th column in the transmittance distribution of the optical filters concerning the light of the i-th wavelength band and transmittance of an optical filter at an m-th row and an n-th column in the transmittance distribution of the optical filters concerning the light of the j-th wavelength band, respectively, $i_0$ and $j_0$ are an average of transmittances of the i-th transmittance distribution and an average of transmittances of the i-th transmittance distribution, respectively, and the N wavelength bands are given numbers in an ascending or descending order of a central wavelength, the correlation coefficient $r_{ij}$ satisfies $r_{ij} > 0.8$ in a combination of the i-th transmittance distribution and the i-th transmittance distribution in which $|i-j|$ is 1, and the correlation coefficient $r_{ij}$ satisfies $r_{ij} < 0.8$ in at least one combination of the i-th transmittance distribution and the i-th transmittance distribution in which $|i-j|$ is greater than or equal to 2 and less than or equal to N−1.

* * * * *